US012482836B2

(12) United States Patent
Henry et al.

(10) Patent No.: US 12,482,836 B2
(45) Date of Patent: Nov. 25, 2025

(54) ELECTROCHEMICAL REACTOR, ELECTROCHEMICAL REACTOR SYSTEMS, PROCESSES FOR ELECTROCHEMICAL REACTIONS, AND METHODS USING SAME

(71) Applicant: Georgia Tech Research Corporation, Atlanta, GA (US)

(72) Inventors: Asegun Henry, Atlanta, GA (US); Matthew McDowell, Atlanta, GA (US); Mehdi Pishahang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 18/979,352

(22) Filed: Dec. 12, 2024

(65) Prior Publication Data

US 2025/0192202 A1    Jun. 12, 2025

Related U.S. Application Data

(60) Provisional application No. 63/714,682, filed on Oct. 31, 2024, provisional application No. 63/608,849, filed on Dec. 12, 2023.

(51) Int. Cl.
*H01M 8/04701* (2016.01)
*C25B 1/16* (2006.01)
(Continued)

(52) U.S. Cl.
CPC .......... *H01M 8/04216* (2013.01); *C25B 1/16* (2013.01); *H01M 8/0289* (2013.01);
(Continued)

(58) Field of Classification Search
CPC .......... H01M 8/04216; H01M 8/0289; H01M 8/04197; H01M 8/04708; H01M 8/04716;
(Continued)

(56) References Cited

U.S. PATENT DOCUMENTS

2015/0093606 A1*  4/2015  Chen ................ H01M 10/4214
                                                           429/105
2018/0316035 A1* 11/2018  Song ................... H01M 8/2455
(Continued)

*Primary Examiner* — Christian Roldan
(74) *Attorney, Agent, or Firm* — TROUTMAN PEPPER LOCKE LLP; Ryan A. Schneider; Brandon M. Reed

(57) ABSTRACT

Electrochemical systems providing reversible operation of high specific energy or gravimetric energy, and high energy density or volumetric energy battery chemistries, methods of operating such systems, processes providing high energy densities and high power densities, and architectures for the successful implementation of such systems, methods and processes. A number of interconnected electrochemical reactors can be assembled to create a battery. By presenting fluidic reactants via pumping, injection and/or other circulation technologies that enable high specific energy, high utilization of reactants, and efficient thermal control, the operation of the electrochemical reactor/battery can be optimized. In a flow battery system and method for handling molten alkali metal and hydroxide species, the volume of the reactants is maximized over inactive components and thus increase energy density. Molten and gaseous reactants/products are fed to/removed from a central power conversion module from/fed to reservoirs for discharge/charge.

16 Claims, 19 Drawing Sheets

(51) Int. Cl.
  *H01M 8/0289* (2016.01)
  *H01M 8/04082* (2016.01)
  *H01M 8/06* (2016.01)
  *H01M 8/18* (2006.01)

(52) U.S. Cl.
  CPC ... *H01M 8/04197* (2016.02); *H01M 8/04708* (2013.01); *H01M 8/04716* (2013.01); *H01M 8/0693* (2013.01); *H01M 8/188* (2013.01)

(58) Field of Classification Search
  CPC .. H01M 8/0693; H01M 8/188; H01M 8/0625; H01M 8/0631; C25B 1/16
  See application file for complete search history.

(56) References Cited

U.S. PATENT DOCUMENTS

| | | | |
|---|---|---|---|
| 2021/0143455 A1* | 5/2021 | Song | H01M 8/04186 |
| 2022/0085402 A1* | 3/2022 | Moriuchi | H01M 4/96 |
| 2022/0109166 A1* | 4/2022 | Fujita | H01M 8/0258 |
| 2022/0316082 A1* | 10/2022 | Street | H01M 8/0693 |
| 2023/0369627 A1* | 11/2023 | Ochi | H01M 4/96 |

* cited by examiner

ELECTROCHEMICAL REACTOR, ELECTROCHEMICAL REACTOR SYSTEMS, PROCESSES FOR ELECTROCHEMICAL REACTIONS, AND METHODS USING SAME

CROSS-REFERENCE TO RELATED APPLICATIONS

This application claims the benefit of U.S. Provisional Application Ser. No. 63/608,849 filed 12 Dec. 2023 and U.S. Provisional Application Ser. No. 63/714,682 filed 31 Oct. 2024, the entire contents and substance of each are incorporated herein by reference in their entirety as if fully set forth below.

STATEMENT REGARDING FEDERALLY SPONSORED RESEARCH OR DEVELOPMENT

This invention was made with government support under DE-AR0001886 awarded by the US Department of Energy. The government has certain rights in the invention.

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The present disclosure relates generally to controlled electrochemical reactions of reactants that without proper handling are volatile, and architectures that render the reactants, and the electrochemical reactions, safe. More particularly, the present disclosure relates to energy storage and conversion systems and methods.

2. Description of Related Art

The architecture for various systems that involve chemical reactions and the safe handling of chemical reactions vary widely. Even among specific fields, like electrochemical reactions related to energy storage and energy delivery technologies, range from different designs best suited for hand-held battery applications, to flow batteries, to secondary batteries, to electric vehicle (EV) batteries, among others.

Discussions in and around the current state of various battery technologies lend themselves well to attendant issues in the larger field of (electro) chemical reactions and various conventional architectures for (electro) chemical reactions and their safe handling. Therefore, battery technologies-their advantages, disadvantages and current road blocks to improvements—are hereinafter specifically discussed as a proxy for the broader category of designs for other chemical reaction architectures.

Conventional battery technologies embody numerous limitations that exclude simply "scaling up" the size/energy/ power of a conventional battery in order to address the growing need for innovative solutions. Scaled-up batteries using conventional battery technology would only have high energy density or high power density, not both, when each are desired (if not necessary) for a battery that can meet the growing demands. Scaled-up batteries using conventional battery technology would be unsafe. And scaled-up batteries using conventional battery technology will still suffer from relatively poor thermal management. An ideal battery, and one in which the present invention attempts to reach, would: exhibit high energy density and high power density, be safe, and deliver quality thermal management.

As for a battery technology that embodies both high energy density and high power density, those of skill in the art appreciate that these two features are often in direct competition or in direct contradiction to a safe battery technology. Naturally, if a lot of energy is packed in a small volume, reactants and products being so close together are inherently unsafe because their proximity could facilitate an uncontrolled discharge of energy, and in catastrophic ways. This is often encountered with commercial battery technologies such as lithium-ion (Li-ion), and presents fundamental conundrums (as yet not solved) associated with developing even higher energy density, and/or higher power density, battery chemistries.

As just one example, an inventive energy and power dense battery could revolutionize electric vehicles (EVs), enabling them to drive longer/further without needing to be recharged. The conventional headwinds associated with developing energy and power dense batteries is in no small measure limiting the electrification of transportation, and thus extending the time horizon for the long sought-after decarbonization of the transportation sector. It is not an overstatement to suggest that innovation in battery technologies in the transportation sector is necessary and urgent in order to mitigate climate change.

Of topical interest in the EV market is "range anxiety," associated with the combination of energy density and the time required for recharging. Li-ion batteries typically provide EVs with 100-500 miles on a single charge. Once exhausted, a long recharge process is required-many times on the order of hours. The relatively limited availability of recharge centers for EV travel means a trip must carefully planned to include those centers as way points, account for the potential back-up of other EVs waiting for availability at a limited number of chargers, and account for the speed of recharging of the chargers that vary widely among the recharge network.

Comparatively, a gasoline fueled car can drive 300-600 miles, while the time for to refuel (recharge) is on the order of minutes, not hours. The combustion vehicle can refuel quickly at gas (refueling) stations that are widely proliferated, with pumps that that pump gas at nearly equivalent speeds so vehicle back-ups are minimal if not frequently non-existent.

As a result of these features, the total driving time, and driving experience, with an EV is quite different (generally negatively so) than with a standard fossil fueled vehicle.

However, in theory, if EV battery technologies could deliver energy densities to enable something like 14 hours of continuous driving (e.g., ~1200 miles), the EV driving experience could rival that of conventional gas vehicles, since 14 hours represents the US Department of Transportation's limit for how long truck drivers can drive in a single stretch. Since such a long drive must then be followed by 10 hours without driving (of rest), which rest time can conceptually be used as time for EV recharging, the range anxiety problem can be ameliorated with a battery with sufficient energy density to enable such long (i.e., ~14 hour) stretches of driving. This potential solution relies on increasing energy densities, as the relatively slow conventional recharging of the EV battery is not affected, but addressed under the mandatory downtime between driving sessions, when the slow conventional recharging of the EV battery occurs over, for example, ten hours. This assumes the EV has exclusive access to a charger.

Another potential solution to the range anxiety problem relies on the speed of recharge, without a change to the conventional availability of a range of 100-500 miles on a single charge. If the recharging of the EV battery were closer to the time it takes to refuel a gas vehicle (in minutes), the disadvantages of EVs as it relates to driving/recharging vis-à-vis the gas vehicle are addressed. In this way, having a battery that can be charged and discharged quickly, similar to refueling a liquid fossil fueled car (i.e., 2-5 minutes), while remaining cost effective, dependable, have high round trip efficiency, and have high energy density similarly addresses the range anxiety problem.

In conventional rechargeable batteries, the reactants are moved very close to each other to enable relatively high charge and discharge rates, but this makes the battery inherently unsafe. In theory, liquid-based flow batteries could be designed with safety in mind if the liquid reactants for the flow batteries were stored at charging stations, but a critical drawback of most flow batteries is their extremely low energy and power density, as they have generally been viewed as applicable for stationary applications (e.g., grid level storage), where weight and volume are much less constrained.

A further disadvantage in conventional batteries is relatively poor thermal management. As used herein, thermal management is the ability to remove the heat that is generated from any inefficiency so that a battery can be scaled up, reaching very large scales without being limited in size. Any electrochemical battery will have some non-ideality, leading to some amount of heat generation due to the current/ion flow. The more power dense, the more concentrated this parasitic heat loss becomes. An ideal battery would include a natural way of extracting and removing this heat, so it can be either reused or dissipated to the surrounding environment without detracting from the battery performance. Furthermore, there is an issue associated with heat removal that pertains to a battery's scale. If a battery relies on heat conduction, over a length scale that is proportional to the total battery or electrochemical reactor/module size, the conductive resistance likely grows with battery size (if another means of heat removal is not introduced). In such situations, the resistance to heat flow and, therefore, heat removal can grow with battery size, thereby limiting the maximum size of the battery that can be feasibly operated at a given power rating, without it overheating itself.

What is needed, therefore, are innovative chemical reaction architectures and chemical reaction chemistries that overcome conventional disadvantages. More particularly, innovative rechargeable battery technologies are needed that overcome the energy and power density trade-off while providing the safety necessary for widespread adoption, and intrinsically allowing for fast recharging and thermal management, such that the innovative technologies can be scaled up without limitations-which is not available from scaled-up conventional battery technologies. Embodiments of the present disclosure address all of these needs as well as other needs that will become apparent upon reading the description below in conjunction with the drawings.

SUMMARY OF THE DISCLOSURE

Briefly described, in an exemplary embodiment, the present invention enables controlled electrochemical reactions of reactants that without proper handling are volatile, and architectures that render the reactants, and the electrochemical reactions, safe.

In exemplary embodiments, the present invention includes electrochemical systems providing reversible operation of high specific energy or gravimetric energy, and high energy density or volumetric energy battery chemistries, methods of operating such systems, processes providing high energy densities and high power densities, and architectures for the successful implementation of such systems, methods and processes.

In exemplary embodiments, the present invention utilizes a number of interconnected electrochemical reactors to create a battery. The present invention optimizes the operation of the electrochemical reactor/battery by presenting fluidic reactants via pumping, injection and/or other circulation technologies that enable high specific energy, high utilization of reactants, and efficient thermal control.

A "fluid," a "fluidic reactant," and like terms refer to any material that flows in response to an applied force. Thus, as used herein, a fluid includes homogeneous and/or heterogenous liquids, gases, plasmas, and combinations thereof. If a material can continuously move and deform (flow) under an applied shear stress, or external force, it is a fluid as used herein.

The system architecture of the present systems, methods and processes finds inspiration from internal combustion engines, treating the electrochemical reaction like combustion. This inspiration derived from the realization that the amount of energy carried in a standard fossil-fueled vehicle greatly exceeds that of an electrochemical battery, yet there is little fear associated with driving a vehicle with such explosive potential. In this respect, although a fossil-fueled vehicle contains large amounts of chemical energy stored in the fuel tank, an uncontrolled discharge is mitigated because the reactant fuel must be heated to the necessary ignition temperature to be dangerous, while it is stored in the fuel tank well below the ignition temperature.

The increase in fuel temperature occurs inside the internal combustion engine—in a heavily shielded and buried location. Most notably, the combustion process occurs in a relatively small volume with both reactants (fuel and air) at very low densities, each effectively a gas. By reducing the reactants' densities specifically and controllably in the location where the highly energetic reaction will take place, reactants that are otherwise inherently unsafe due to their high energy/power density are rendered safe.

The present invention applies this basic set of operating principles to an electrochemical reaction, with inventive architectures that have previously been left unexplored with a lack of creative re-imagining of the electrochemical reaction, and presents systems, methods and processes that overcome the conventional disadvantages of the prior art systems, methods and processes.

The inventive systems and processes of the present invention incorporate fresh approaches to the combination of system architecture with energy storage chemistries to reimagine ways electrochemical energy storage and conversion systems and methods reach high energy densities, safely.

In an exemplary embodiment, the present invention is an electrochemical system comprising a first reservoir configured to contain a first reactant, a second reservoir configured to contain a second reactant separately from the first reactant, an electrochemical reactor in material transport communication with the first reservoir and the second reservoir, and a material transport assembly.

The material transport assembly is configured to provide the material transport communication between the electrochemical reactor and the first and second reservoirs, present the first reactant as a fluid to the electrochemical reactor, and present the second reactant as a fluid to the electrochemical reactor, wherein the system is configured to maintain a reaction product as a fluid, the reaction product resultant from an electrochemical reaction in the electrochemical reactor between the first reactant and the second reactant, and the reaction product comprising an ionically conductive, yet electronically insulating, fluid.

In any exemplary embodiment, the electrochemical system can further comprise a reaction product (third) reservoir in material transport communication with the electrochemical reactor.

In any exemplary embodiment, the material transport assembly can be further configured to provide the material transport communication between the electrochemical reactor and the reaction product reservoir. The reaction product reservoir can be configured to contain the reaction product separately from the first reactant and the second reactant.

In any exemplary embodiment, the reactants and reaction product can be stored in their respective reservoirs in any form, including as a fluid or as a solid.

In any exemplary embodiment, the electrochemical system can further comprise a thermal management mechanism.

In any exemplary embodiment, the thermal management mechanism can be configured to exchange heat between the reactants and the reaction product.

In any exemplary embodiment, the thermal management mechanism can be configured to at least one of provide heat to one or more portions of the material transport assembly, or remove heat from one or more portions of the material transport assembly, such that a temperature of reactant and/or reaction product flowing through the material transport assembly at one or more locations of the thermal management mechanism is respectively raised or cooled.

In any exemplary embodiment, the thermal management mechanism can be configured to exchange heat between the reservoirs.

In any exemplary embodiment, the material transport assembly can be further configured to draw at least a portion of the first reactant from the electrochemical reactor to the first reservoir.

In any exemplary embodiment, the material transport assembly can be further configured to draw at least a portion of the second reactant from the electrochemical reactor to the second reservoir.

In any exemplary embodiment, the material transport assembly can be further configured to draw at least a portion of the reaction product from the electrochemical reactor to the reaction product reservoir.

In any exemplary embodiment, the material transport assembly can comprise conduits formed of one or more materials that are stable at temperatures at which the material transport assembly is subject to via the transport of the reactants, and reaction product.

In any exemplary embodiment, the material transport assembly can comprise one or more transport control devices selected from a group consisting of valves, pumps, mass flow controllers, and a combination thereof.

In any exemplary embodiment, the electrochemical reactor can comprise a negative electrode portion in material transport communication with the first reservoir.

In any exemplary embodiment, the electrochemical reactor can comprise a positive electrode portion in material transport communication with the second reservoir.

In any exemplary embodiment, the electrochemical reactor can be configured such that the negative and positive electrode portions are separated one from the other via a density difference between the reaction product and the first and second reactants.

In any exemplary embodiment, the negative and positive electrode portions of electrochemical reactor can be separated one from another via a physical separator positioned within the electrochemical reactor and forming a geometrical interface between the first reactant and the second reactant.

In any exemplary embodiment, the electrochemical reactor can further comprise a separator configured to provide/maintain geometric separation within the electrochemical reactor at an interface between the first reactant and the second reactant.

In any exemplary embodiment, the separator can be a high surface area current collector/current delivery structure positioned in the positive electrode portion of the electrochemical reactor.

In any exemplary embodiment, the separator can comprise many different types of electrical conductor, for example, graphite and conducting ceramics, and in many types of structural form, for example, a metallic mesh structure.

In another exemplary embodiment, the present invention is an electrochemical system comprising a first reservoir configured to contain a first reactant, a second reservoir configured to contain a second reactant, a reaction product reservoir configured to contain a reaction product, a power conversion module in material transport communication with the first reservoir, the second reservoir, and the reaction product reservoir, the power conversion module comprising interconnected electrochemical reactors, a thermal management mechanism, and a material transport assembly.

The material transport assembly can be configured to provide the material transport communication between the power conversion module and the first, second, and reaction product reservoirs.

The material transport assembly can be further configured to, during a forward/discharging process, transport the first reactant from the first reservoir and present the first reactant as a fluid to each electrochemical reactor. More particularly, present the first reactant to the negative electrode portion of each electrochemical reactor.

The material transport assembly can be further configured to, during a reverse/charging process, transport the first reactant from each electrochemical reactor to the first reservoir.

The material transport assembly can be further configured to, during the forward/discharging process, transport the second reactant from the second reservoir and present the second reactant as a fluid to each electrochemical reactor. More particularly, present the second reactant to the positive electrode portion of each electrochemical reactor.

The material transport assembly can be further configured to, during the reverse/charging process, transport the second reactant from each electrochemical reactor to the second reservoir.

The material transport assembly can be further configured to, during the forward/discharging process, transport a reaction product resultant from an electrochemical reaction in each electrochemical reactor between the first reactant and the second reactant from each electrochemical reactor to the reaction product reservoir.

The material transport assembly can be further configured to, during the reverse/charging process, transport the reaction product from the reaction product reservoir to each electrochemical reactor.

In any exemplary embodiment, each respective reservoir can be configured to contain the respective reactant separately from the other reactants.

In any exemplary embodiment, the electrochemical reactors of the power conversion module can be interconnected in series, parallel, or a combination of both a portion in series and a portion in parallel.

In another exemplary embodiment, the present invention is an energy management system comprising a first reactant, a second reactant, and a electrochemical reactor having a positive electrode portion and a negative electrode portion.

In a forward/discharging process of the energy management system, the first reactant is fed to the negative electrode portion of the electrochemical reactor as a fluid, the second reactant is fed to the positive electrode portion of the electrochemical reactor as a fluid, an electrochemical reaction of the first and second reactants produces a reaction product and current, and at least a portion of the reaction product produced is removed from the electrochemical reactor.

In a reverse/charging process of the energy management system, a voltage difference is applied to the reaction product that causes electrolysis, form the first reactant and the second reactant, at least a portion of the first reactant is removed from the electrochemical reactor, and at least a portion of the second reactant is removed from the electrochemical reactor.

In any exemplary embodiment, the reaction product can be an ionic compound.

In any exemplary embodiment, the reaction product can be an electrolyte.

In any exemplary embodiment, the reaction product can be an electrolyte, and the energy management system can further comprise a second electrolyte.

In any exemplary embodiment, the second electrolyte can be a solid electrolyte.

In any exemplary embodiment, in the forward/discharging process, the first reactant can be controllably fed from a first reservoir in which the first reactant is stored to the negative electrode portion of the electrochemical reactor.

In any exemplary embodiment, in the forward/discharging process, the second reactant can be controllably fed from a second reservoir in which the second reactant is stored to the positive electrode portion of the electrochemical reactor.

In any exemplary embodiment, in the forward/discharging process, the reaction product produced can be removed from the electrochemical reactor and transported to a reaction product reservoir.

In any exemplary embodiment, in the reverse/charging process, the first reactant can be removed from the electrochemical reactor and transported to the first reservoir.

In any exemplary embodiment, in the reverse/charging process, the second reactant can be removed from the electrochemical reactor and transported to the first reservoir.

In any exemplary embodiment, the first reactant can be fed to the negative electrode portion of the electrochemical reactor as a molten fluid.

In any exemplary embodiment, the second reactant can be fed the positive electrode portion of the electrochemical reactor as a gas.

In another exemplary embodiment, the present invention is an electrochemical method comprising transporting stored first reactant in a first stored state to a reaction zone of an electrochemical reactor in a fluid state (in some embodiments, a liquid or molten state), transporting stored second reactant in a second stored state to the reaction zone in a fluid state (in some embodiments, a gas state), and transporting a reaction product from the electrochemical reactor, the reaction product in a fluid state (in some embodiments, a liquid state) in the electrochemical reactor as a result of an electrochemical reaction in the reaction zone between the first and second reactants.

In any exemplary embodiment, the electrochemical reactor can comprise a rechargeable battery with an energy density >1000 Wh/kg.

In any exemplary embodiment, the electrochemical reactor can comprise a rechargeable battery with an energy density >1000 Wh/L.

In any exemplary embodiment, the first stored state of the first reactant can be different than the fluid state.

In any exemplary embodiment, the second stored state of the second reactant can be different than the fluid state.

In any exemplary embodiment, the first stored state of the first reactant can be the fluid state.

In any exemplary embodiment, the second stored state of the second reactant can be the fluid state.

These and other aspects of the present invention are described in the Detailed Description below and the accompanying figures. Other aspects and features of embodiments of the present disclosure will become apparent to those of ordinary skill in the art upon reviewing the following description of specific, exemplary embodiments of the present invention in concert with the figures. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAIL DESCRIPTION OF THE INVENTION

Figure 1:
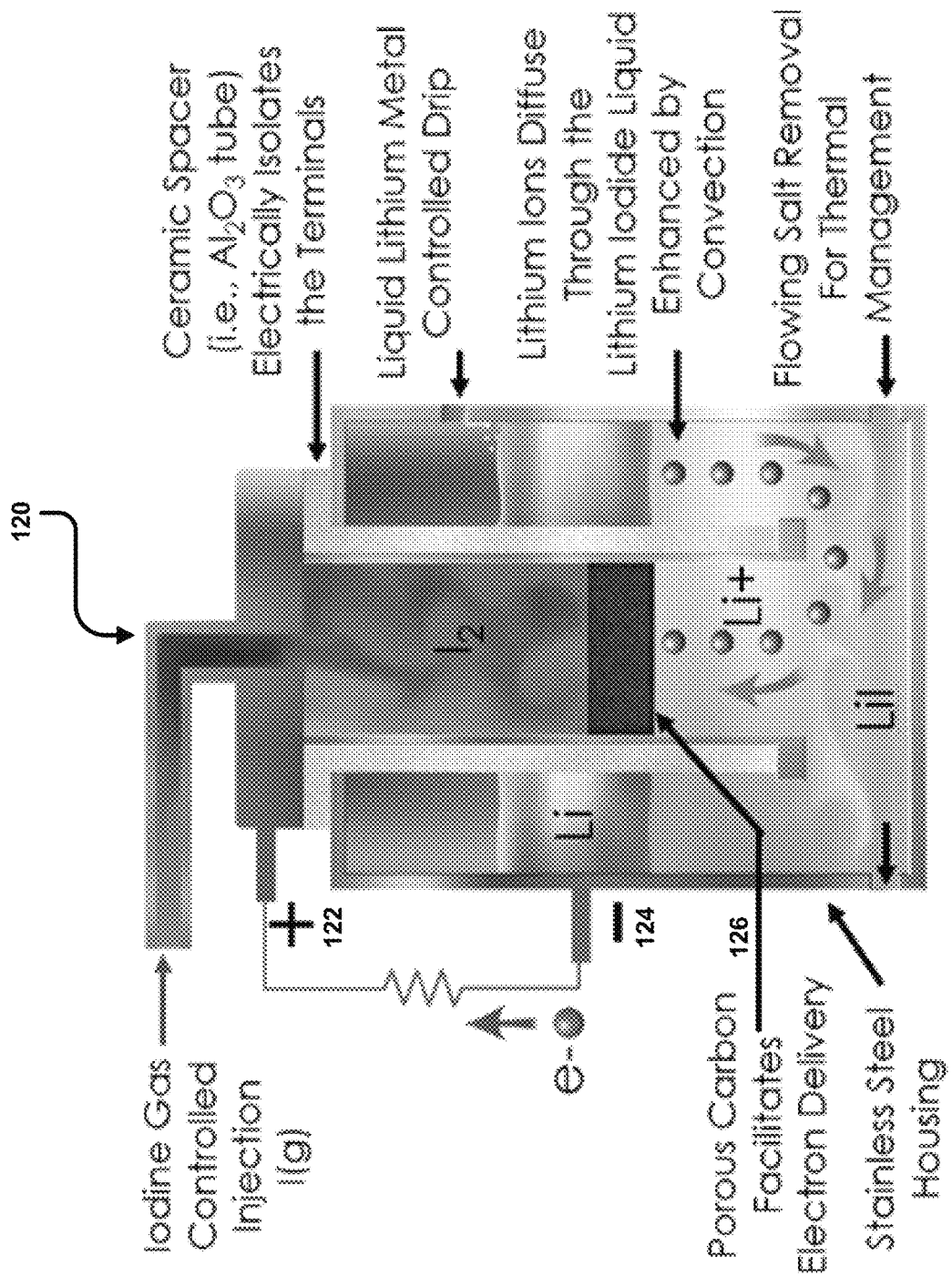
FIG. 1 is a schematic of an electrochemical reactor of the present invention, in accordance with exemplary embodiments illustrating the use of a reactant of iodine gas, a reactant of fluidic lithium and a reaction product of lithium iodide that doubles as an electrolyte. Reactors can be interconnected (in parallel or in series) with additional reactors.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition, article, or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 2:
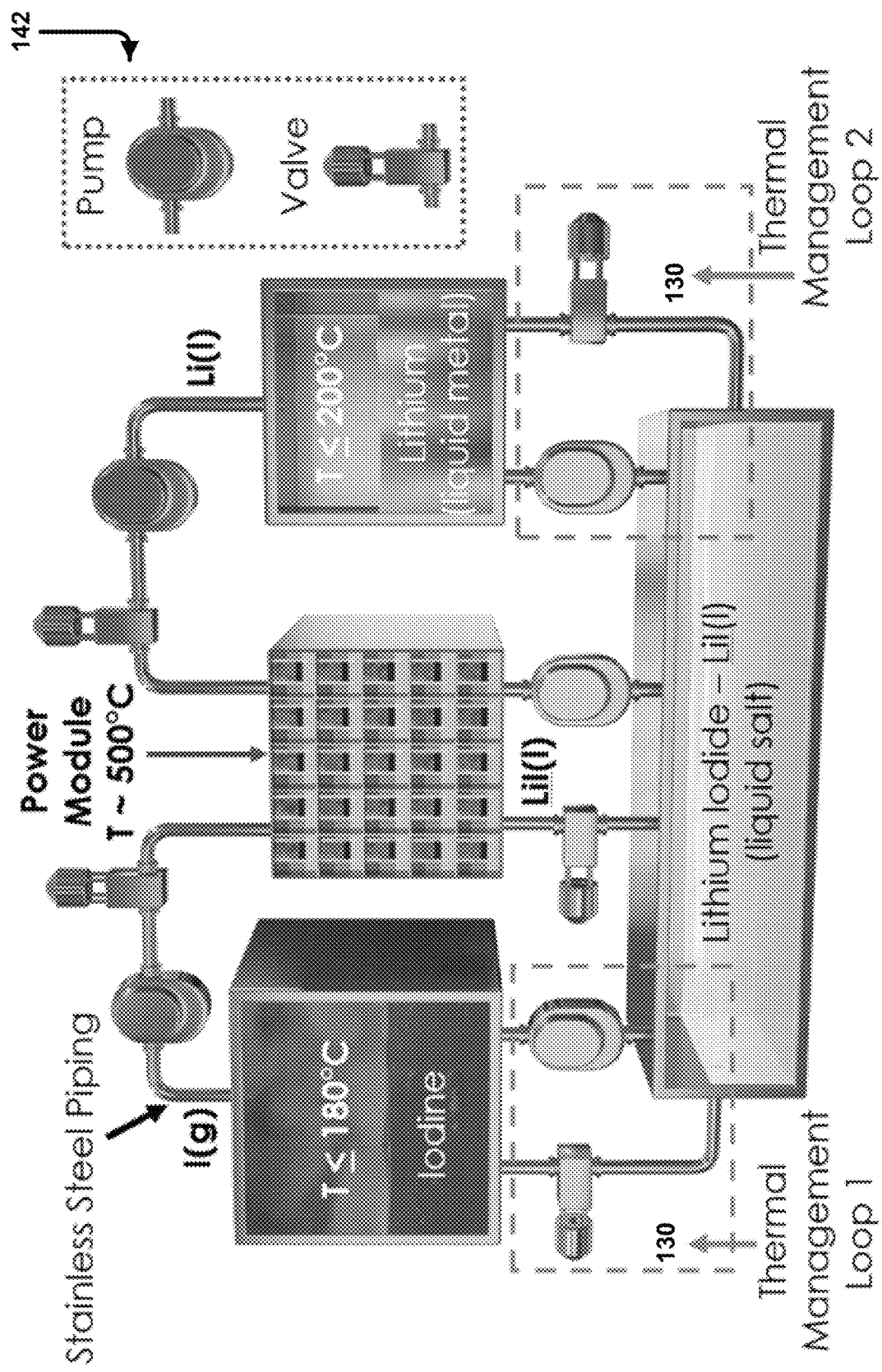
FIG. 2 is a system schematic showing an array of electrochemical reactors of FIG. 1 forming a power conversion module, the power conversion module connected to reservoirs configured to store the reactants/reaction product in accordance with exemplary embodiments.
Figure 3:
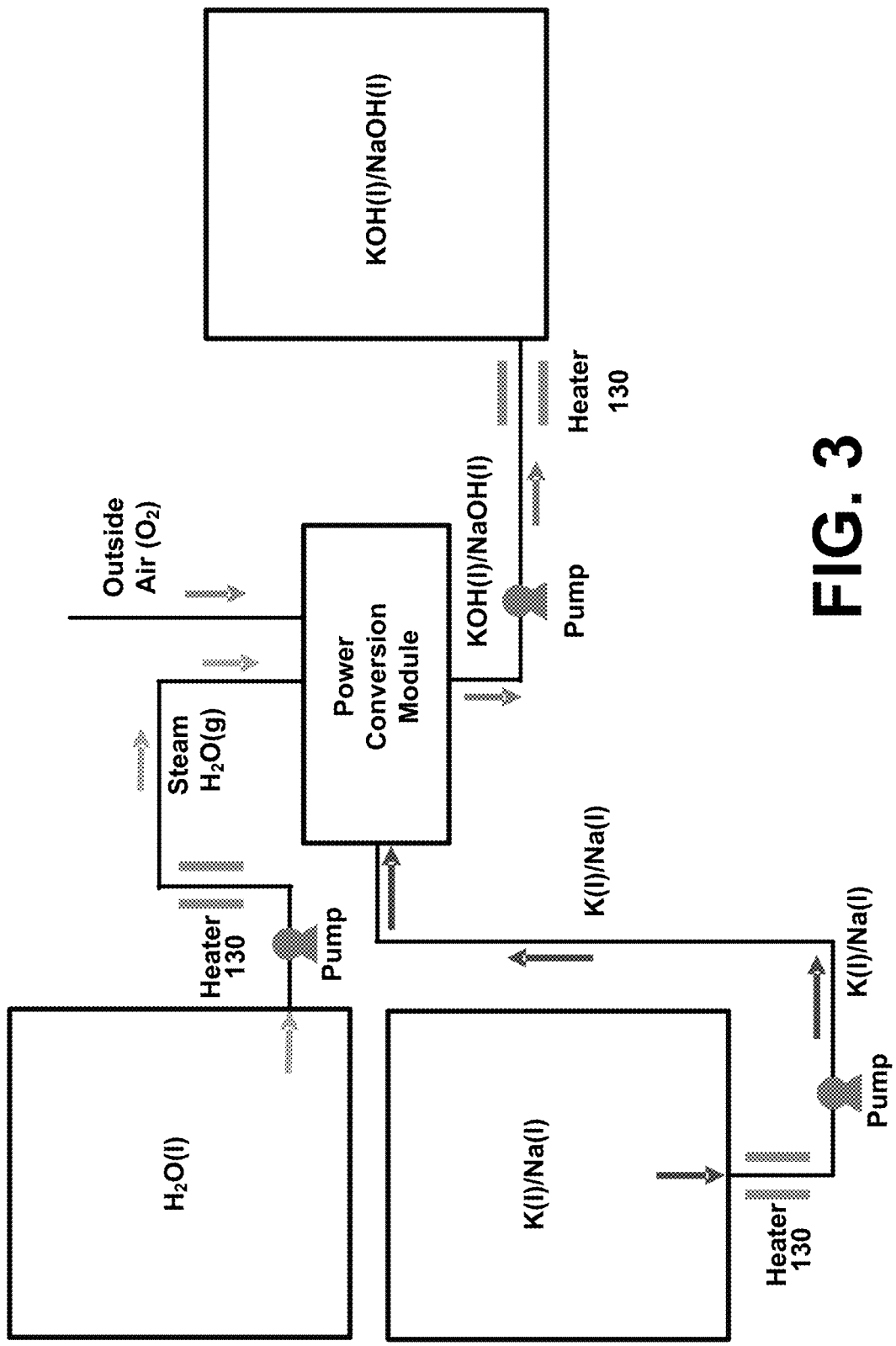
FIG. 3 is a system schematic showing an array of another embodiment of electrochemical reactors forming a power conversion module, connected to reservoirs of the reactants/reaction product, wherein one reactant is water, another reactant is air, another reactant is molten sodium (Na) or potassium (K) metals and a reaction product is molten alkali hydroxide (NaOH or KOH).
Figure 6:
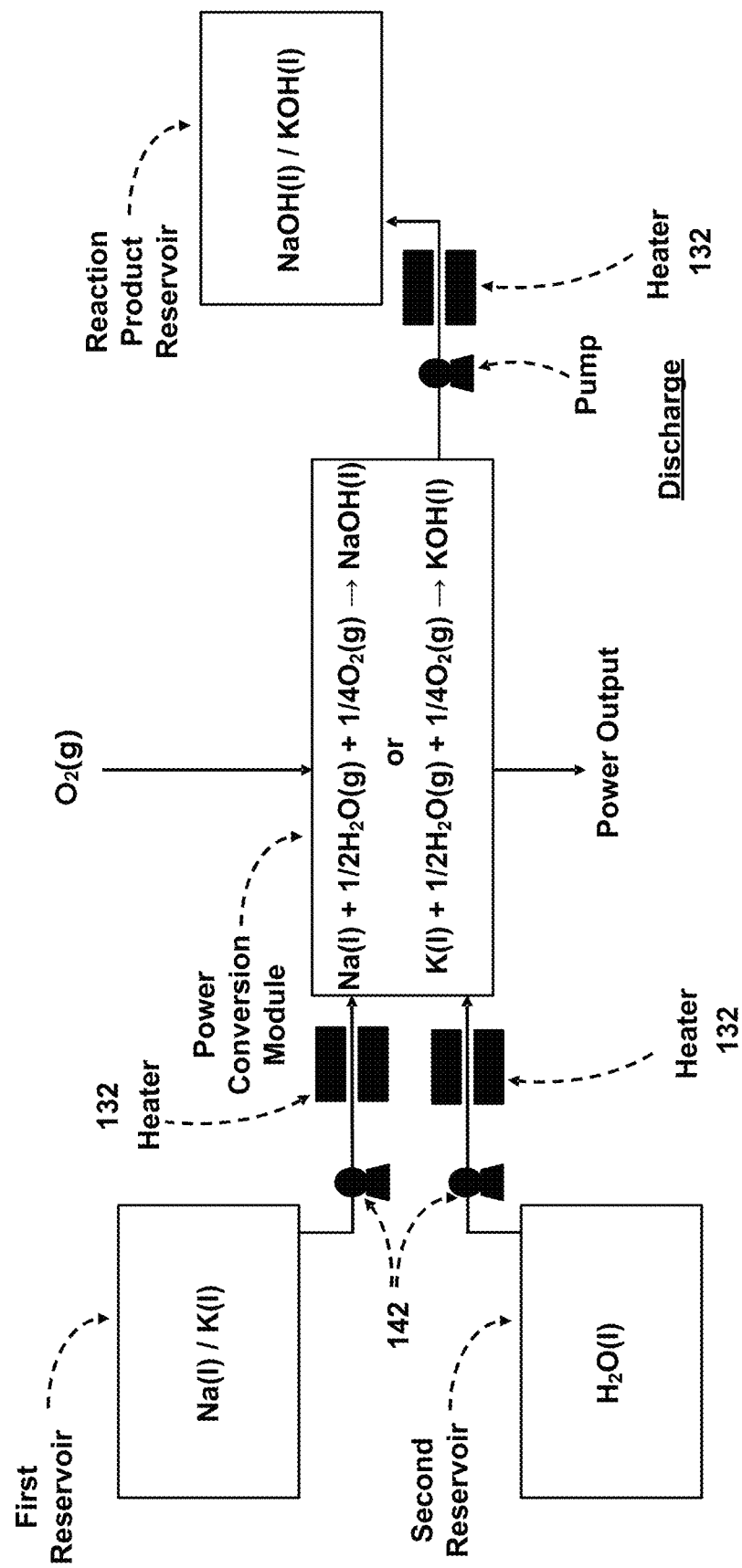
FIGS. 6-7 are exemplary set of schematic diagrams of a discharging process and a charging process of the reactants of FIG. 3.
Figure 7:
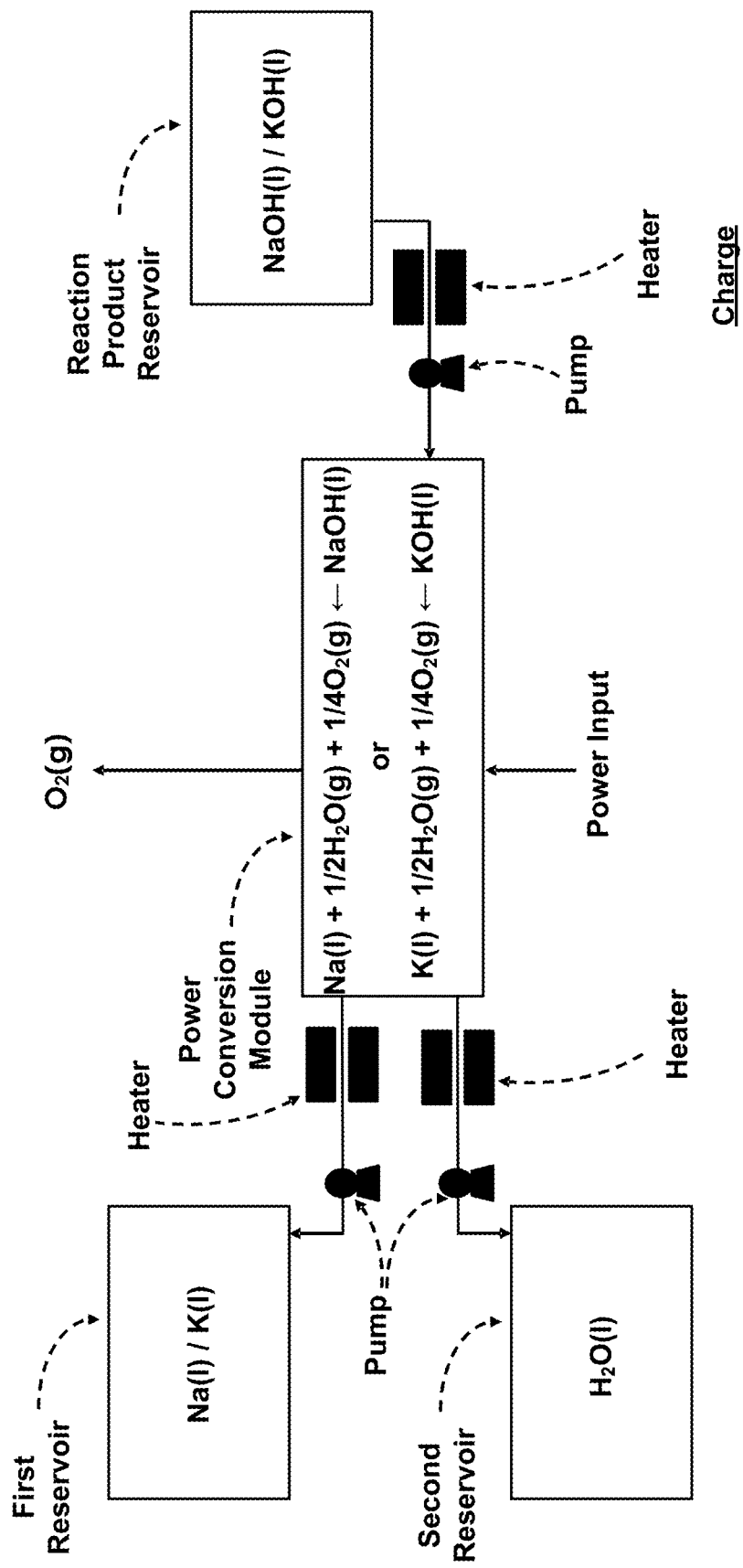
Figure 8:
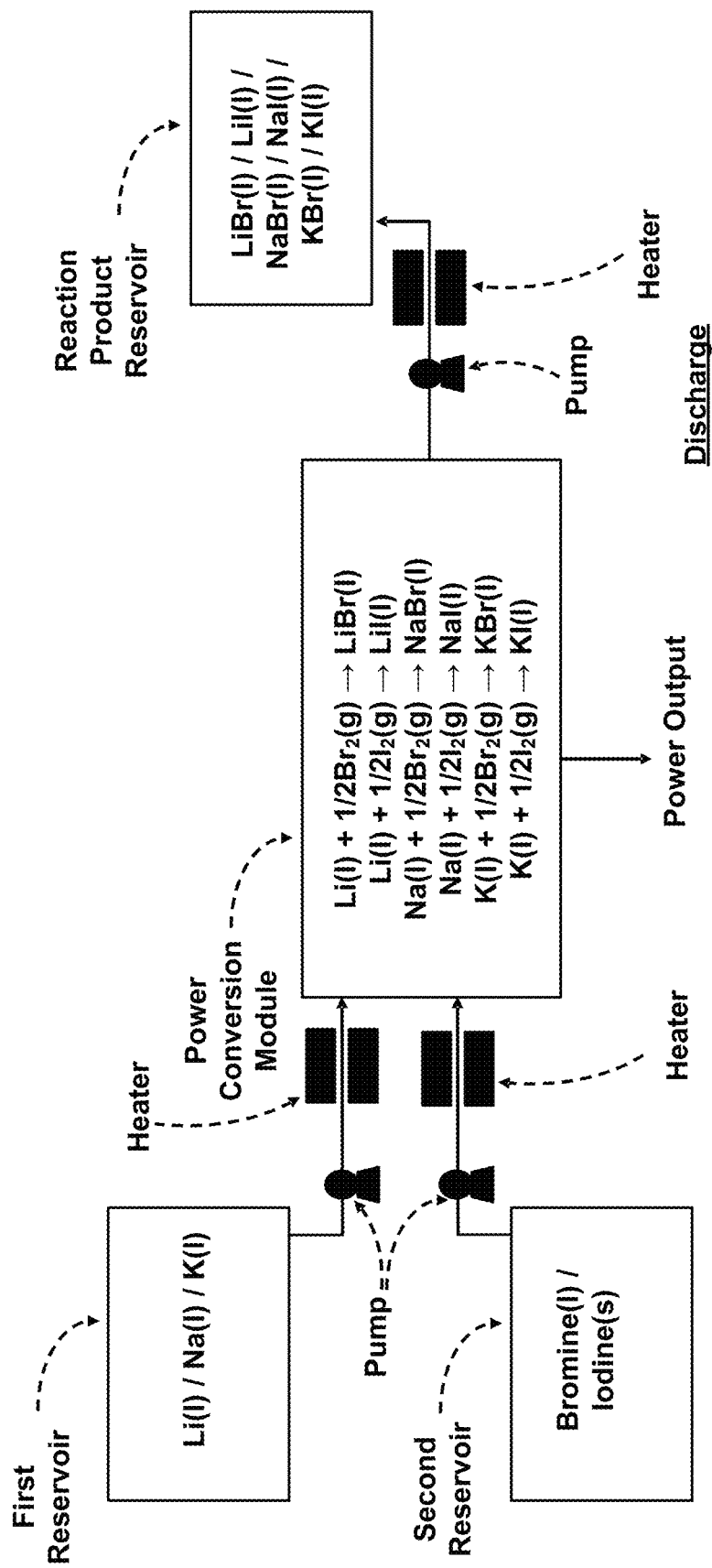
FIGS. 8-9 are another exemplary set of schematic diagrams of a discharging process and a charging process of other exemplary chemical couples.
Figure 9:
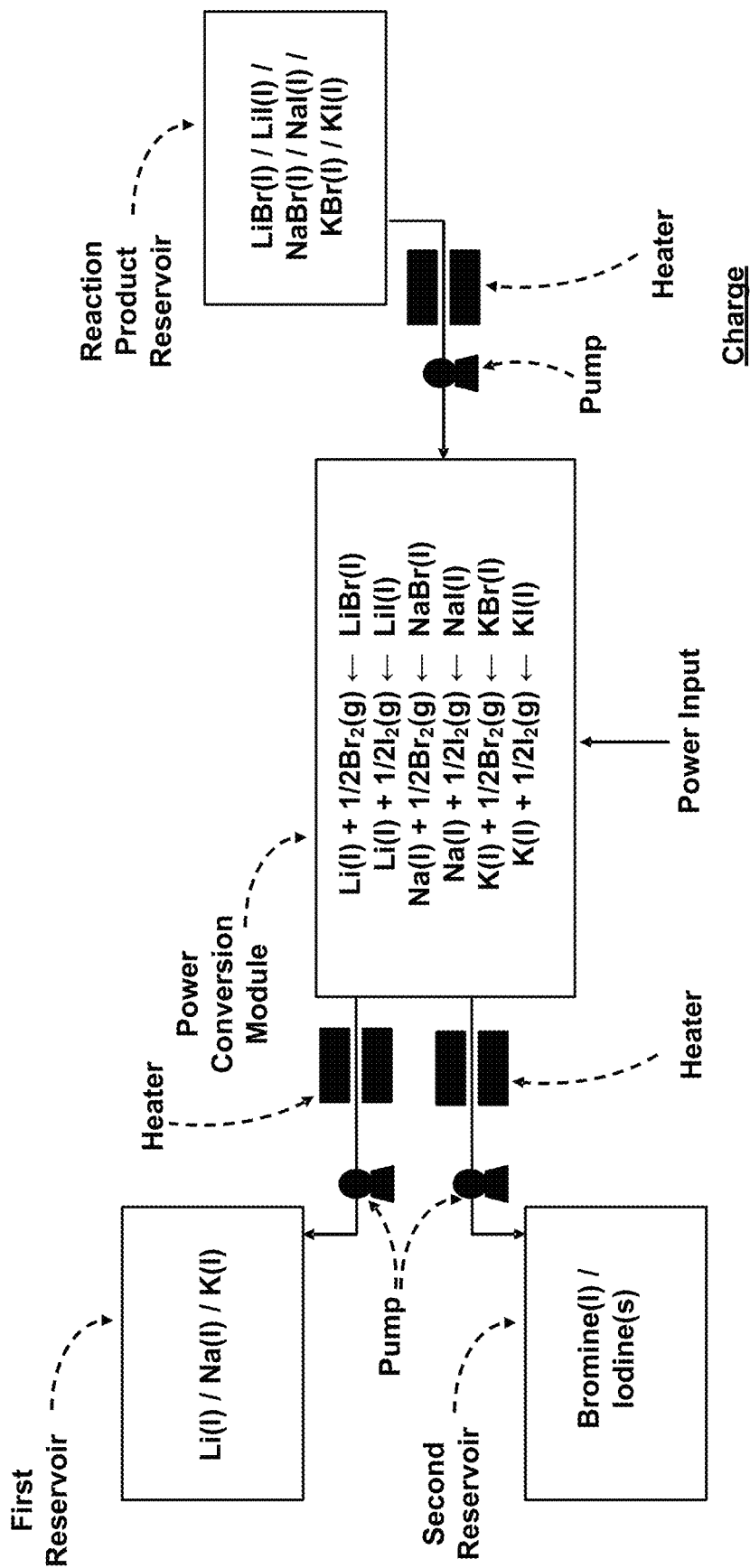

An inventive architecture for the safe operation of energy and power dense chemistries including lithium (Li) and iodine (I) is shown in FIGS. 1 and 2, with the operative electrochemical reaction $Li_{(1)} + \frac{1}{2} I_{2(g)} \leftrightarrow LiI_{(1)}$. FIGS. 3 and 6-7 illustrate an inventive architecture for the safe operation of energy and power dense chemistries fluidic potassium (K) or sodium (Na) with oxygen ($O_2$) and steam/water ($H_2O$) to form potassium/sodium hydroxide.

Although two primary reactants are shown, those of skill in the art will appreciate that additional reactants can be intelligently handled if three or more species are needed to form a desired product, and the present invention contemplates same. For example, FIGS. 3-6 illustrate the inclusion of air. Further, those of skill in the art will also appreciate that other reactant pairs or larger groups can be applied in a similar and/or derivative manner.

Figure 4:
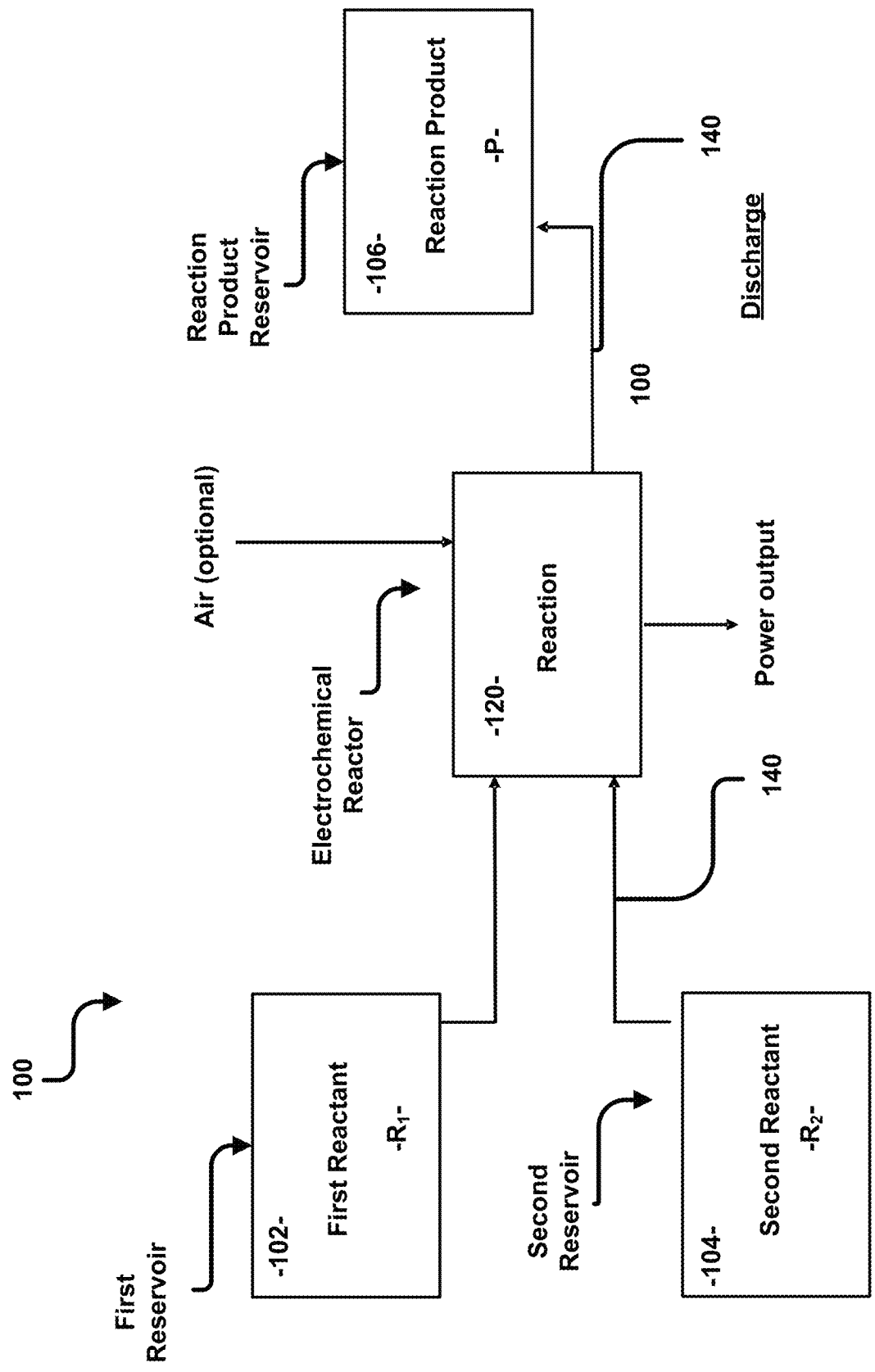
FIG. 4 is a general schematic diagram of a discharging process of a two reactant embodiment of the present invention, with an optional third reactant input, and showing the direction of flows.
Figure 5:
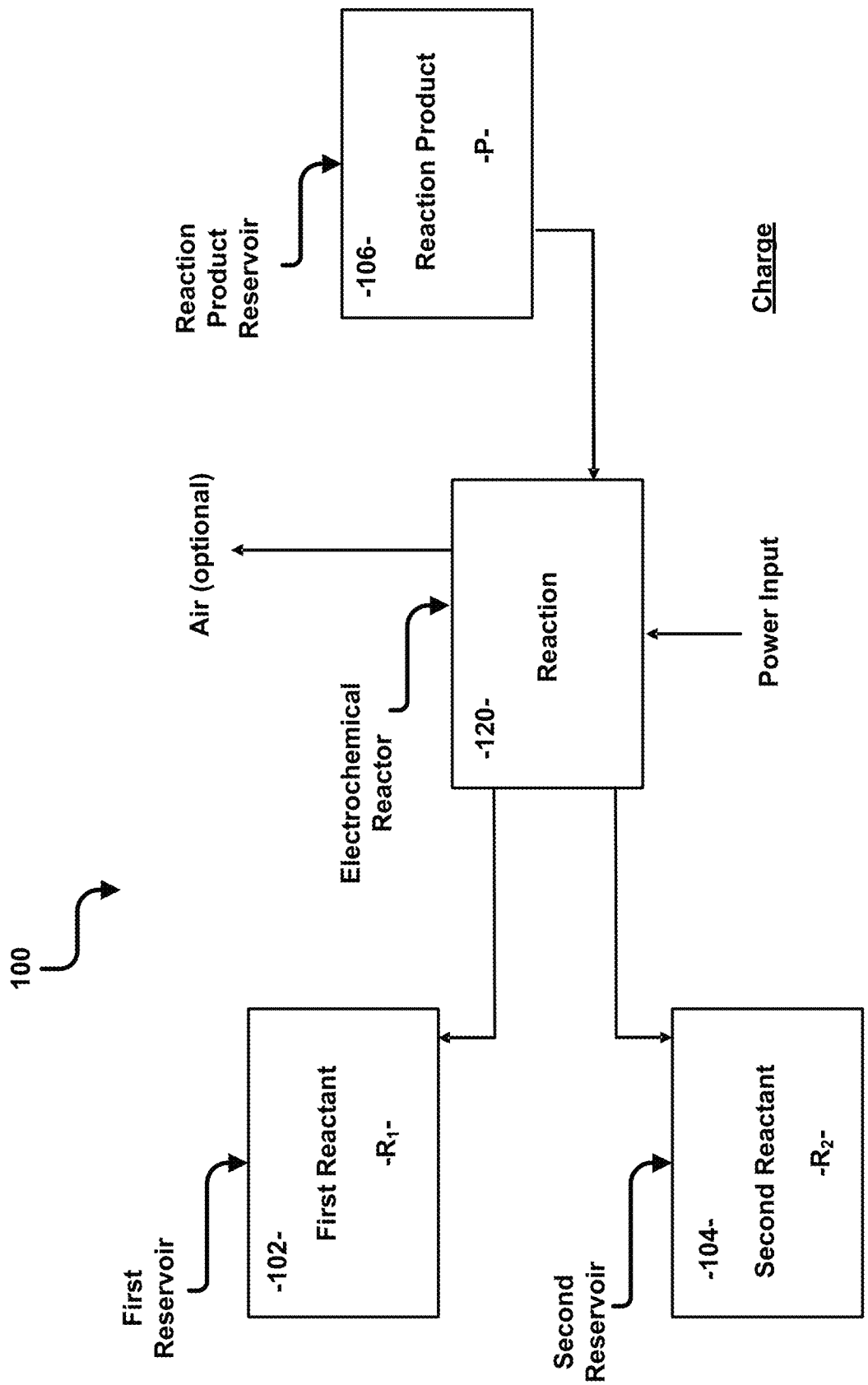
FIG. 5 is a general schematic diagram of a charging process of the embodiment of FIG. 4, and showing the direction of flows.

FIG. 4 illustrates a general schematic diagram of a discharging process of a two reactant embodiment of the present invention, with an optional third reactant input, and showing the direction of flows, while FIG. 5 is a general schematic diagram of a charging process of the embodiment of FIG. 4, and showing the direction of flows.

As shown in the figures, the present invention can comprise an electrochemical system 100 comprising a first reservoir 102 configured to contain a first reactant $R_1$, a second reservoir 104 configured to contain a second reactant $R_2$ separately from the first reactant $R_1$, an electrochemical reactor 120 in material transport communication with the first reservoir 102 and the second reservoir 104, and a material transport assembly 140 configured to provide the material transport communication between the electrochemical reactor 120 and the first and second reservoirs 102, 104, present the first reactant $R_1$ as a fluid to the electrochemical reactor 120, and present the second reactant $R_2$ as a fluid to the electrochemical reactor 120, wherein the system is configured to maintain a reaction product P as a fluid, the reaction product P resultant from an electrochemical reaction in the electrochemical reactor 120 between the first reactant $R_1$ and the second reactant $R_2$.

The electrochemical system can further comprise a reaction product reservoir 106 in material transport communication with the electrochemical reactor 120, wherein the material transport assembly 140 is further configured to provide the material transport communication between the electrochemical reactor 120 and the reaction product reservoir 106, and the reaction product reservoir 106 is configured to contain the reaction product P separately from the first reactant $R_1$ and the second reactant $R_2$.

The electrochemical system can further comprise a thermal management mechanism 130 configured to exchange heat between the reactants $R_1$, $R_2$ and the reaction product P. The thermal management mechanism 130 can be configured to at least one of provide heat via heating mechanisms 132 to one or more portions of the material transport assembly, or remove heat from one or more portions of the material transport assembly, such that a temperature of reactant $R_1$, $R_2$ and/or reaction product P flowing through the material transport assembly at one or more locations of the thermal management mechanism is respectively raised or cooled. The thermal management mechanism 130 can also configured be configured to exchange heat between the reservoirs 102, 104, 106.

The material transport assembly 140 is preferably configured to draw at least a portion of the first reactant $R_1$ from the electrochemical reactor 120 to the first reservoir 102, draw at least a portion of the second reactant $R_2$ from the electrochemical reactor 120 to the second reservoir 104, and draw at least a portion of the reaction product P from the electrochemical reactor 120 to the reaction product reservoir 106.

The material transport assembly 140 can comprise conduits formed of one or more materials that are stable at temperatures at which the material transport assembly is subject to via the transport of the reactants $R_1$, $R_2$ and reaction product P, and one or more transport control devices 142 (FIGS. 2, 6) selected from a group consisting of valves, pumps, mass flow controllers, and a combination thereof.

The electrochemical reactor 120 can comprise a positive electrode portion 122 in material transport communication with the first reservoir 102 and a negative electrode portion 124 in material transport communication with the second reservoir 104.

The electrochemical reactor 120 can further comprise a separator 126 configured to be positioned within the electrochemical reactor 120 at an interface between the first reactant $R_1$ and the second reactant $R_2$. The separator 126 can be a high surface area current collector/current delivery structure positioned in the positive electrode portion 124 of the electrochemical reactor 120.

Returning to FIG. 1, it illustrates an individual ~2.6V electrochemical reactor, while FIG. 2 illustrates a full flow battery system that includes storage tanks/reservoirs for Li, iodine, and lithium iodide (LiI) salt, along with examples of pumps, valves and piping to deliver the reactants to the power conversion module (center), which comprises a multitude of the electrochemical reactors exemplified in FIG. 1 in series and parallel.

Lithium metal floats on top of the LiI salt which serves as a high conductivity electrolyte, whereby transport of the $Li^+$ ions is enhanced by the LiI flow. The entire external body of the electrochemical reactor constitutes a negative electrode, while the iodine gas delivery tube serves as a positive electrode. The iodine gas delivery tube is in electrical contact with a porous carbon mesh that also floats on top of the LiI salt.

Iodine gas is injected from the top and diffuses into the mesh where it electrochemically reacts with the $Li^+$ to form fluidic LiI, which is then actively removed from the system via the pumping configuration illustrated in FIG. 2.

As shown in FIG. 2, heat released/wasted in the power conversion module is actively removed by flowing the LiI salt to and from the LiI salt reservoir. Separate thermal management loops are also shown, which circulate the hotter salt to exchange heat with the iodine and lithium to keep them fluid and to facilitate the boiling/evaporation of the iodine, which is recovered in the power conversion module when the LiI fluid is formed.

Although the exemplary embodiment of FIGS. 1 and 2 relates to energy storage and conversion systems and methods, other exemplary embodiments of the present invention include architectures that can be used more generally for an electrochemical reactor system—e.g., to produce a desired chemical product or products.

As described, the invention of FIGS. 1 and 2 illustrates two reactants stored in separate reservoirs, whereby a single or multiple materials are physically situated between them, such that they are unable to chemically interact. In one particularly simple and energy/power dense case, if Li and I were ever brought into direct contact, the chemical interaction between these two species would be extremely exothermic and violent, as it would form lithium iodide salt (LiI). However, it is important to note that despite the extremely thermodynamically favored reaction, all three chemicals (i.e., Li, I, and LiI) have relatively low melting points, less than 500° C. One significance of using reactants with melting points less than 500° C. is that this temperature is low enough that it is well within the realm of temperatures applicable to any of a variety of materials selected for the construction of the various structural components of the system shown in FIGS. 1 and 2. Such materials could include, for example, iron and nickel alloys, which are commonly used for structural components in engineering systems.

The electrochemical reaction includes $Li_{(l)} + \frac{1}{2} I_{2(g)} \leftrightarrow LiI_{(l)}$.

As shown in FIG. 2, the lithium and iodine can be stored in separated reservoirs that prevent them from chemically interacting prior to the intention to do so (within the electrochemical reactor shown in FIG. 1). However, if the reservoirs were linked to the electrochemical reactor, their electrochemical reaction could be facilitated in a way that provides electricity, rather than simply allowing them to chemically react to produce heat.

The electrochemical reactor of in FIG. 1 is structured in such a way that Li is fed into it in fluid form, e.g., via pump(s) (FIG. 2) that move liquified or gasified Li from the reservoir into the region of the electrochemical reactor responsible for power conversion. As one of skill in the art will appreciate, the system need not comprise pumps to transport the reactants, as other ways of imparting fluid movement can be leveraged, such as draining by gravity, wetting by capillary action, boiling, and/or increasing vapor pressure and relying on fluid diffusion.

By restricting the volume of the passageway (e.g., a tube or pipe) between the reservoir and the electrochemical reactor, extremely energy dense reactants can be rendered safe, by simply limiting the accessible volume that could escape or participate in an uncontrolled discharge. Fluid flow valves, mass flow controllers, and/or other mechanical fluid restriction equipment, which could be controlled in an automated, semi-automated or passive way, can be used to limit if not prevent undesirable effects in the system.

The present invention incorporates the innovative ability to control and change the physical location of the reactants and/or reaction product(s). In a typical flow battery, this control/change approach is primarily used to decouple energy storage volume from power conversion module volume, enabling a wide range of power-to-energy ratios. In the present invention, this control/change approach not only serves this feature, but additionally enables new approaches to safety, as inspired by normal combustion engine systems with a fuel tank and fuel injection pumps/valves.

To facilitate an electrochemical reaction, the electrochemical reactor of FIG. 1 can contain two regions that include a positive electrode and negative electrode for the participation of electricity. In between the electrodes, a form of ionically conductive, yet electronically insulating separator, should exist, and in FIG. 1, it inventively can be the reaction product of the reaction LiI (as a fluid). Here, LiI serves as an electrolyte, and has a notable characteristic that it is more gravimetrically dense than fluidic Li metal.

In the electrochemical reactor, Li can be injected in fluid form, which then floats on the top of the surface of a locally small amount of LiI salt, which is also in fluid form. In order for the electrochemical reaction to take place, iodine gas, which is purple in color, can be injected near the other electrode.

With the inclusion of an electrical conductor, localized to and in contact with the other electrode, when iodine gas is injected, Li atoms will ionize at one electrode providing electrical current that can do useful work. The Li ions will then diffuse through the LiI salt electrolyte, which has high conductivity, since it is in the fluid state, over to the other electrode. At locations where the electrical current carrying material is able to interact with both iodine and an electron from the current carrying material, LiI salt will be formed. This process can occur repeatedly to yield a continuous electrochemical discharge that produces LiI salt as the reaction product.

Of importance in this specific embodiment, the electrochemical reactor system further comprises a fluidification mechanism configured to maintain the LiI locally in the fluid state. In an exemplary embodiment, the fluidification mechanism is heat, where the electrochemical reactor operates at a high enough temperature to keep the LiI locally in the fluid state. By doing so, the LiI electrolyte can be drained away, either by pump, gravity, capillary action or otherwise. By removing at least a portion of the reaction product from the electrochemical reactor, the overflow or buildup of the reaction product in the electrochemical reactor is limited if not prevented, and the product LiI can be stored in a reaction product reservoir for later use during recharging.

The present invention embodies inventive thermal management strategies when presenting the two reactants in fluid form to the electrochemical reactor, as well as maintaining the reaction product as a fluid electrolyte. Locally, as the electrochemical reaction takes place, the reactants and reaction product/electrolyte will come into local thermal equilibrium, and as LiI salt is removed from the electrochemical reactor, it can be used to extract the heat generated. Additionally, a fluid reaction product/electrolyte can easily be moved/transported, either passively or actively, to other locations in the system, for heat recuperation, or for more facile heat dissipation.

In exemplary embodiments, the iodine reactant can be supplied to the electrochemical reactor in gaseous form, thereby mimicking fuel injection into a combustion engine. Similarly, as noted previously, the passageways or conduits for the supply of the reactants can have its volume restricted to minimize the total energy that could be released in an unintentional/accidental uncontrolled discharge. Furthermore, both lithium and the iodine could be held in their respective reservoirs in fluid or solid form. For example, both reactants can be stored as room temperature solids, and only when electricity is needed, the system can change the states of the stored reactants via, for example, local heating (i.e., externally or with recuperated heat) to provide small quantities of the reactants to the electrochemical reactor, on demand. This local heating or fluidification approach can serve as yet another safety feature that minimizes the potential for the two reactants to come into contact in an uncontrolled manner.

Returning to FIG. 1, in a discharging process, lithium electrochemically reacts with iodine to form LiI salt. Once reacted, the LiI can be drained or removed from the electrochemical reactor, and need not be stored in the same fluid form as it is maintained in the electrochemical reactor, but could instead be allowed to solidify in a container or the storage reservoir, so as to not require constant heating. Similar to the potential local heating or fluidification process described for the reactants, the same could be applied to the reaction product(s).

To recharge the system, a voltage simply needs to be applied to the two electrodes in the electrochemical reactor. This splits the LiI salt into a Li ion that diffuses through the electrolyte, and iodine gas can then be returned back to the iodine storage reservoir.

The Li ions diffuse to the opposite electrode and form Li metal that will locally float on top of the LiI salt surface. This fluidic metal can then be pumped or drained back into the Li storage reservoir for later reuse.

In this way, the reactants and reaction product(s) can be contained in a fully sealed system that is close-looped. Furthermore, a new world of safety provisions can be enlisted to protect against accidental and/or unintended breaching of any vessels containing the reactant or reaction product. For example, a material that could react and form a solid encasement with the reactants in such a vessel can be used to protect the reactants from ambient conditions/the outside environment.

For example, the reservoir for Li can have an outer shell layer, trapped between successive steel vessels, which contains LiI salt in fluid form. In the event of an accident, if the vessel were punctured, the LiI salt can be stored at slightly elevated pressure so that it automatically drains into any punctured area to quickly cover any exposed Li metal from gaining access to oxygen from the surrounding air. In doing so, the Li metal can be stored at a sufficiently low temperature such that the salt quickly freezes upon contact with the Li metal, forming a protective crust that limits if not prevents uncontrolled reaction with the surrounding environment. In this way, by separating the reactants into the separate storage reservoirs, additional safety provisions are enabled that can keep the system and/or operators safe, despite a very large amount of energy being contained therein.

As discussed, the present invention embodies a completely new space of innovations that leverage the basic operating principles outlined above.

In another exemplary embodiment, using a very different chemistry, but leveraging the same basic design principles to achieve an extremely energy/power dense battery architecture. In this exemplary embodiment, energy storage chemistries of the present systems and methods find inspiration from the industrially-used Castner process (reverse/charging) and fuel electrochemical reactors (forward/discharging).

The present invention intrinsically separates reactants to enhance safety and takes advantage of inventive pumping and handling of fluid reactants and reactions product(s) to maximize a volume of reactants over inactive components, which lead to increases in energy density.

In a forward/discharging process where chemical energy is converted to electrical energy, in this embodiment of the present invention, a first reactant is controllably fed from a first reservoir to a negative electrode portion of an electrochemical reactor as a fluid reactant and a second reactant is controllably fed from a second reservoir to a positive electrode portion of the electrochemical reactor as a fluid reactant. The electrochemical reaction of the first and second reactants produces a reaction product that can also serve as an ion-conducting and electron-insulating electrolyte. The temperature of the reactants/reaction product in the electrochemical reactor are preferably in the range of from $-50°$ C. to $1000°$ C., and more preferably below $600°$ C. As one of skill in the art will appreciate, while the elevated temperatures of the reactants/reaction product are to achieve fluidification of various constituent materials (or using other conditions to achieve same), the temperature range is also dictated by the material structures of the architecture. For example, below $600°$ C. allows for using a wider choice of materials than with higher temperatures.

As one of skill in the art will appreciate, the lower limit(s) of temperature ranges can indeed be below $0°$ C. For example, if a reactant is mercury, it has melting point of $-390°$ C. Use of eutectic metal solutions, melting points can drop even more significantly.

In a reverse/charging process where electrical energy is converted to chemical energy, a voltage difference applied to the reaction product causes electrolysis that forms the first reactant(s) and the second reactant(s), wherein at least a portion of the first reactant is removed from the power conversion unit to the first reservoir, and at least a portion of the second reactant is removed from the power conversion unit to the second reservoir.

It will be understood by those of skill in the art that while the present invention may provide at least one of the reactants to the reactor in fluid form, any storage/reservoir of the injected reactant need not contain/store the reactant in gaseous form. Much like the vehicle gas tank in relation to a combustion engine, a reservoir of the present invention can contain/store (as a fluid or solid) a reactant that will enter the reactor as a fluid. The present invention is designed such that the state in which the reactant is stored can be changed via, for example, evaporation into the gaseous state prior to delivery into the reactor or fluidization of a solid by melting it into fluid. And as is equally clear, in a reverse reaction, where a reactant is removed from the reactor and delivered to storage/a reservoir, once again, the state of the reactant in the reactor can be different from the state of the reactant supplied to the reservoir for storage. A stored gas, liquid, plasma or a solid reactant can change states as between a storage reservoir and the form the reactant takes in the reactor, and vice versa.

The present invention as a system can therefore comprise two reservoirs that contain, separately, one of the two primary reactants. The system further comprises the power conversion unit where the two reactants experience an electrochemical reaction that produces electricity. The reaction product can be a fluid (an electrolyte and/or a thermal management compound) that can be removed from the power conversion unit and stored in a reaction product reservoir. This system architecture allows for use of the most energy dense couples possible in a safe way.

In any exemplary embodiment, the reservoirs can be thermally controlled. For example, they can be heated and can be insulated to maintain the heat.

In any exemplary embodiment, the transport and delivery mechanisms for delivery to/from a reservoir to/from the power conversion unit can comprise pumps with build specifications designed to materially handle the reactants at their requirements for superior performance of the present technology—for example, reactants at a variety/extreme temperatures, reactants in different states from solids, liquids, molten liquids, plasmas and gaseous, reactants in a range of densities, and reactants in a range of pressures. Therefore, tubing and/or pumps can be made from a variety of materials, including ceramic, metals, plastics, and other forms necessary to handle the reactants of the present invention.

In any exemplary embodiment, the transport and delivery mechanisms for delivery to/from a reservoir to/from the power conversion unit can be pump-free, for example, using differential concentration gradients, gravitationally or buoyancy driven flows, surface tension driven flows or electromagnetically driven flows.

In any exemplary embodiment, the present invention further comprises a current collector or current deliverer. This too can be in a variety of forms, shapes and locations about the invention, for example, being a solid or fluid (liquid/plasma) conductor of electricity.

In any exemplary embodiment, a preferred reactant and/or the way the system operates the reactant, enables fluidity of the reactant. This can include, for example, the reactant has a melting point and/or a vaporization point (cf. vapor pressure) that enables the operational characteristics herein described. Alternatively, pressures used and/or chemical interactions can impart the fluidity characteristics to the reactant.

In an exemplary embodiment, the reactants can be chosen so the reaction product(s) has/have a melting point enabling easy transport (so that the reaction product(s) do not form a solid that might freeze locally and prevent any further transport).

A preferred reaction product beneficially is a liquid or a gaseous product such that it can be transported away from the reactor. A preferred reaction product is an ionic compound/an ionic conductor. Alternatively, an additional ionic compound can be present beyond the reaction product. For example, a solid ion conducting material (such as sodium beta alumina) can separate the negative and positive electrode chambers, while still maintaining the reaction product(s) in fluid/liquid form. In this embodiment, the solid ion conducting material can be a second ionically conductive material present in the system.

In any exemplary embodiment, safety measures beyond choices of reactants and material selection can include, for example, encasing a container/reservoir (double walled or triple walled) to avoid puncture. Another material can be placed in an outer shell that would render the reactant inert, i.e., pacifies the reactant. Contents of the pacifying shell can be selected to react with the reactant endothermically, so it will cool it down and freezes it.

Returning to the system architecture of the present systems and methods, attention was drawn to similarities between this research and the internal combustion engine.

The internal combustion vehicle operates with vast amounts of energy and a hydrocarbon fuel, yet everybody feels safe driving.

This led to investigations into why combustion engines are safe (or at least appear safe enough for common use). One reason the internal combustion engine is safe is because the "reactor" has a relatively small volume (the cylinders of the engine), and the "reactants" for the combustion are tightly controlled—systems are in place to provide a "controlled amount" of fuel and air. Further, the controlled feeds of fuel and air must be coaxed to mix, because in the combustion engine, air and fuel do not mix passively. Additionally, for safety reasons, the fuel tank in a normal vehicle is not wrapped around the engine, which is hot. Conversely, many battery architectures bring the two reactant close together volumetrically. This is nominally done to decrease the distance required for diffusion, which is needed to obtain a substantial power output. However, here, the reacting media themselves are physically moved in fluid form to abate this requirement, thereby opening up a new spectrum of physical arrangements.

One way to control the feeds of the combustion engine reactants, and to ensure mixing of the reactants, is to use controlled injection of the fuel and air. Put another way, energy must be spent to (i) transport the combustion engine reactants from reservoirs to the cylinders, to (ii) change the state of at least one reactants from its stored state to its combustion state—from liquid fuel in the fuel tank (like gasoline or diesel) into a dispersed liquid or vapor before it can combust—and to (iii) finely control the injection the fuel in a vapor state into the small volume of the cylinders so that the combustion reaction can take place. The internal combustion engine reaction is carried out in a largely gaseous phase. The reaction dynamics of the engine uses (very) small amounts of reactants at a given time in a (very) small volume.

In the present invention, the safety and reliability of the combustion engine led to an engine-like architecture for electrochemical reactions—that electrochemical reactions can be made safe without fleeing from the conventional fear of choosing couples with high energy and power density demands (but unsafe).

The present invention builds upon these aspects and includes an innovative power conversion unit (reactor), forming a smaller region in which the power conversion takes place. Further, the present invention has at least one the reactants in fluid form so "injection" of the fluid reactant(s) into the reactor can be finely and safely controlled, and so controlled without sophisticated mechanisms. Indeed, the injected fluid reactant(s) can be controlled via a valve if so chosen.

While not required, injection of at least one of the reactants in gas form means that reactant will be in the lowest density form in which it can exist. Therefore, a maximum amount of energy that could uncontrollably discharge if the design were flawed is limited by the amount of gas that happens to be in the reactor (a relatively small amount) and in whatever small diameter tubing leads to the reactor. And that volume of the reactants in gas form, by definition, can be made very small, which means the attendant total amount of energy that might be uncontrollably released is similarly small. Further, delivery of the reactant(s) in a gaseous form can easy be snuffed out if trouble arises by simply closing a valve.

Moving from the present invention's system/battery architecture, the present invention also embodies a variety of different energy storage chemistries that facilitate superior performance over the conventional technologies, namely akin to those used in the Castner process (reverse/charging) and in fuel electrochemical reactors (forward/discharging).

As mentioned, the present invention was borne from the above considerations by asking, if taken to an extreme case, find the most promising "couples" (chemical combinations) to reach a highest (if only theoretical) energy density. Known couples include, for example, sodium hydroxide (Na—OH), sodium iodide (Na—I), lithium-oxygen (Li—$O_2$), lithium-sulfur (Li—S), lithium-iodine (Li—$I_2$), lithium-bromine (Li—$Br_2$) and lithium-fluorine (Li—$F_2$), with Li—$O_2$ generally considered to have the highest theoretical energy density. Some of these and other exemplary couples are shown in FIGS. 6-9.

Of course, practical challenges would need to be overcome as such reactions by definition would be extremely exothermic if allowed to occur in an uncontrolled manner. For example, Li—$F_2$ would seem highly impractical due to its relatively high melting point (~850° C.) and the extreme reactivity of fluorine. However, such a couple could be adapted to this architecture, if for example a F dense containing compound were to be stored, and heat or some other fluidification process were used to liberate F gas on demand, such that it could be injected into the electrochemical reactor.

Investigation once again led to extremes, and the continuum therebetween. For example, two ends of the periodic table were reviewed, lithium (the least dense metal; the least dense solid element; highly reactive and flammable) and iodine (the heaviest of the stable halogens; not flammable). There are a variety of energy dense couples possible, each with different energy content reactions. Lithium and iodine were investigated specifically because: iodine can be vaporized at quite a low temperature; lithium can be melted at quite a low temperature; and in respect to battery architecture, when lithium and iodine electrochemically react, they produce a salt. Further, with thermal management of the power conversion unit at a high enough temperature (a few hundred degrees), the reaction product that is formed, lithium iodide (LiI), can be a fluid with high ionic conductivity, can serve as an electrolyte, and can be used in thermal management aspects of the present invention.

In another exemplary embodiment, the present invention is a flow battery handling molten alkali metal and hydroxide species to maximize the volume of reactants over inactive components and thus increase energy density. The flow battery comprises molten and gaseous reactants/products at respective molten temperatures that are fed to (or removed from) a central power conversion module from (or fed to) reservoirs for discharge/charge, similar to a conventional flow battery. The chemistry is based on the electrochemical reaction of molten sodium (Na) or potassium (K) metals with water vapor and oxygen to produce the molten alkali hydroxide (NaOH or KOH), which also acts as the fluidic electrolyte. The alkali hydroxide naturally settles to the bottom of each electrochemical reactor since it is the densest substance present, where it intrinsically separates positive and negative electrode chambers and thus negates the need for an ion-transporting membrane separator. Controlled injection/removal of an $H_2O/O_2$ mixture reactant into the positive electrode chamber limits a propensity for unsafe operation.

The charge step of the flow battery is the same as the Castner process, whereby a voltage difference applied to the hydroxide causes electrolysis to form Na (or K) at the negative electrode and a $O_2/H_2O$ mixture at the positive electrode. The Castner process was developed over 100 years ago for Na production, but it has fallen out of favor in part because the produced molten Na is exposed to an oxidizing atmosphere of the produced $O_2$ and $H_2O$. The present invention bypasses this issue by maintaining the Na (or K) under an inert curtain, separated from the $O_2/H_2O$ chamber by a physical barrier comprising, for example, a metal or ceramic, and the molten Na (or K) floats on the molten hydroxide since the density of both $Na_{(l)}$ and $K_{(l)}$ are significantly lower than those of their related hydroxides.

The discharge step of the flow battery is the reverse process. Both $O_2$ (from air) and $H_2O$ (steam) are controllably injected and reduced at the positive electrode to form OH−, while Na+ (or K+) are formed by oxidation of the alkali metal at the negative electrode. This discharge process is similar to the operation of a molten hydroxide direct carbon fuel electrochemical reactor. Such fuel electrochemical reactors take advantage of the ionic conductivity of OH-ions in potassium hydroxide (KOH) as an electrolyte to transport hydroxide ions from cathode to anode. The positive electrode reaction is the same, and these devices use nickel electrodes. A combination of features of the conventional Castner process and molten hydroxide direct carbon fuel electrochemical reactor instill confidence that both the forward (discharging/fuel electrochemical reactor) and reverse (charging/Castner) processes operate safely. Thus, the present invention optimizes a reversible battery with fluidized reactants and/or products that enable high specific energy and efficient thermal control.

One aspect of the present invention is the use of an ionic compound in molten phase (e.g., alkali hydroxide or alkali halide, etc.) as both the electrolyte and the reaction product, as well as the innovative architecture/chemistry of the electrochemical reactor/system. The ionic conductivities of the molten ionic compounds (e.g. alkali hydroxides or alkali halides) are orders of magnitude higher than solid electrolytes in conventional use (e.g., polymeric or ceramic solid electrolytes). Nonetheless, the present invention can include, for example, a ceramic solid electrolyte used in conjunction with the fluid reaction product.

Another aspect of the present invention is that it can operate at a moderately elevated temperature (−50° C. to 1000° C.) or under other conditions to achieve fluidification of various constituent materials. This not only ensures the electrolyte is and remains in a molten state, but it also maintains many of the reactants and reaction products in liquid or gas phases, which facilitate vaporization and subsequent gas/fuel injection into a power unit. The elevated temperature also increases the ionic conductivities of the various phases, which enables the present battery to behave like a reversible electrochemical reactor, where reactants and reaction products are stored separately in tanks and are only pumped to/from the reactor (i.e., the battery electrochemical reactor) when discharge or charge is needed. This enables the safe operation of a battery that can fully react all reactants.

Another aspect of the present invention is an innovative architecture for electrochemical devices that can be used for reversible energy conversion and storage at elevated temperatures. The present invention can be designed to purposefully use all three phases of matter (i.e., solid, liquid, and gas) to solve critical safety issues conventionally associated with high energy density reactions. As discussed, a principal reason why the highest energy reaction couples are challenging to harness in practice is because of the propensity for uncontrolled discharge. This challenge is partially addressed in flow batteries by spatially separating the anode and cathode materials into different chambers. However, uncontrolled reactions can still occur if there is mechanical failure of ion-transporting membranes. The present innovative architecture allows for usage of extremely high energy density redox couples.

Another aspect of the present invention is the selection of multiple energy storage chemistries that can be utilized in the present device architecture. One exemplary chemistry is a high-temperature reversible alkali metal hydroxide battery that works via reaction of an alkali metal with components of air for energy conversion and storage. Another exemplary chemistry is the combination of molten alkali-metals with halides for energy storage.

Potential applications of the present invention range from stationary applications (such as grid level energy storage), to transportation applications (such as cars and trucks), to aeronautical and marine applications and more.

The present invention can deliver a low cost per kilowatt hour (kWh), as well as very high theoretical energy densities. For example, the present system can utilize low-cost electrode materials: Na is ~\$3/kg and K is ~\$13/kg, while air and $H_2O$ are essentially free. In terms of raw material costs, a range from ~1.2 \$/kWh for Na and ~8.3 \$/kWh for K are possible. Theoretical energy metrics are 1959 Wh/kg and 1503 Wh/L for Na, and 1220 Wh/kg and 928 Wh/L for K. Another advantage of the present invention is related to the elevated temperature nature of the device. This allows for use in applications where high temperature energy storage is needed, such as military aeronautical applications and space applications, and more.

FIG. 3 illustrates another exemplary design enabling safe operation of a high-energy secondary battery electrochemical reactor. As discussed, this approach was inspired by controlled fuel injection in an internal combustion engine. Instead of having both reactants in a solid or fluid phase, the present invention limits the potential of an uncontrolled reaction by controllably introducing a first reactant as a fluid. The present invention controls the introduction of the gas in a reaction zone with valves and mass flow controllers, while the bulk of a second reactant and reaction product remain aggregated in a fluid phase in large spatially-separated volumes, similar to a flow battery.

Preferably, the electrochemical reactor operates at a moderately elevated temperature (−50° C. to 1000° C.) to maintain all reactants and reaction products in the liquid or gas phases, as well as to facilitate vaporization and subsequent gas/fuel injection.

One exemplary reversible chemistry is the reaction of liquid potassium (K) or sodium (Na) with oxygen ($O_2$) and water ($H_2O$) to form potassium/sodium hydroxide: $4Na_{(l)}+2H_2O_{(g)}+O_{2(g)} \leftrightarrow 4NaOH_{(l)}$. See, for example, TABLE 1A.

Another exemplary chemistry combines liquid alkali metal (e.g., lithium) with gaseous halide (e.g., iodine), which electrochemically react to form lithium iodide (LiI): $Li_{(l)}+\frac{1}{2} I_{2(g)} \leftrightarrow LiI_{(l)}$. All three materials are held in the fluid state, and the iodine is delivered to the power conversion module as a gas $I_{2(g)}$, similar to fuel injection in a gasoline engine. The LiI salt serves as the electrolyte and also doubles as a heat transfer fluid to facilitate efficient thermal management of the entire system. See, for example, TABLE 1B.

TABLE 1A

|  | Na | NaOH | K | KOH |
|---|---|---|---|---|
| Melting Point (° C.) | 98 | 318 | 64 | 420 |
| Density (g/cm³) | 0.97 | 2.13 | 0.86 | 2.12 |

TABLE 1A-continued

|  | Na | NaOH | K | KOH |
|---|---|---|---|---|
| Electrical conductivity at melting point (S/cm) | $2.1 \times 10^5$ | 2.1 | $1.3 \times 10^5$ | 2.7 |

TABLE 1B

|  | Li | LiI | Li | LiBr |
|---|---|---|---|---|
| Melting Point (° C.) | 180 | 469 | 180 | 550 |
| Density (g/cm$^3$) | 0.53 | 4.08 | 0.53 | 3.45 |
| Electrical conductivity at melting point (S/cm) | $1.1 \times 10^5$ | 1.2 | $1.1 \times 10^5$ | 5.6 |

Tables 1A, 1B—Properties of Exemplary Alkali Metals, Halides, and Hydroxides

When operated at temperatures >318° C. for K and 420° C. for Na, this discharge reaction will involve liquid metal (K/Na) and gaseous oxygen and steam reacting to form KOH or NaOH liquids, which themselves act as the ion-conducting electrolyte separating the reactants.

Molten alkali hydroxide is the densest substance (TABLE 1A) and therefore rests at the bottom of the electrochemical reactor chamber, intrinsically separating the reactant chambers.

Keys to harnessing this reaction are 1) careful design of the electrochemical reactor and system to manage solely liquid and gaseous products/reactants; 2) effective control over the stability of materials in contact with the high-temperature molten fluids; and 3) thermal management.

To further detail the reaction mechanism, gaseous $H_2O$ and $O_2$ can be injected into the positive electrode chamber, while molten K or Na metal is injected into the negative electrode chamber. The discharge reaction at the negative electrode is $Na_{(l)} \rightarrow Na^+_{(l)} + e^-$, and that at the positive electrode is $2H_2O_{(g)} + O_{2(g)} + 4e^- \rightarrow 4OH^-_{(l)}$. The alkali hydroxide is the reaction product 140, and acts as the electrolyte.

As those of skill in the art appreciate, air has some water vapor in it. Therefore it may not be necessary to store water, form steam, and deliver steam to the battery. The battery can therefore only receive air in the positive side and that air contains both $O_2$ and $H_2O$ in it.

An exemplary electrochemical reactor further comprises a current collector/delivery structure. It can be a high surface area current collector/delivery structure (e.g., a Ni mesh) in the positive electrode chamber to enable power density >1.5 kW/kg. It is expected that the electrochemical active surface area at the positive electrode will play a key role in determining overall electrochemical reactor impedance and kinetics, since there is limited area that the Ni tube contacts the alkali hydroxide/$H_2O$—$O_2$ interface.

Depending on electrochemical reactor parameters, high-temperature electrochemistries of different high surface area mesh structures (Ni, Fe, and C) can be used depending on, for example, key transport and reaction kinetics inputs, since there is limited area that the Ni tube contacts the alkali hydroxide/$H_2O$—$O_2$ interface. To increase this surface area, the Ni mesh can be used and optimized for its porosity and surface area. Such Ni meshes are commercially available with tailored properties, exhibiting 200-400 g/m$^2$. The wettability of the molten hydroxide and the Ni mesh was investigated, as was the influence of gas formation during charge on bubble formation and potential dewetting at these interfaces.

FIGS. 3 and 6 shows a system-level schematic of the present system with an array of individual electrochemical reactors in a power conversion module region, connected to reservoirs of $H_2O_{(l)}$, $O_{2(g)}$, $K_{(l)}$ or $Na_{(l)}$, and the alkali hydroxide$_{(l)}$.

The hydroxide level is actively adjusted using flow to/from an external reservoir to ensure appropriate operational level. The system design also features reservoirs of the reactant metal (Na or K) and $H_2O$ which are pumped to/from the central power conversion module.

Pumping of molten metal and hydroxide maximizes energy density. Altogether, this electrochemical reactor design bypasses known issues with low-temperature alkali-$O_2$ or alkali-$H_2O$ batteries, including slow kinetics, product clogging of porous electrodes, and reaction irreversibility.

The inventive system involves storing reactants and reaction products in the reservoirs/external tanks, and pumping them to/from the individual electrochemical reactors. Multiple electrochemical reactors connected in series or parallel can be used to generate desired voltages. This design allows for treating the electrochemical reactor the same as a reversible chemical reactor, where reactants and reaction products are stored separately in tanks and are only pumped to/from the reactor (i.e., the battery electrochemical reactor) when discharge is needed. This enables the safe operation of the present invention, and importantly, it allows for full reaction of all reactants.

Figure 10:
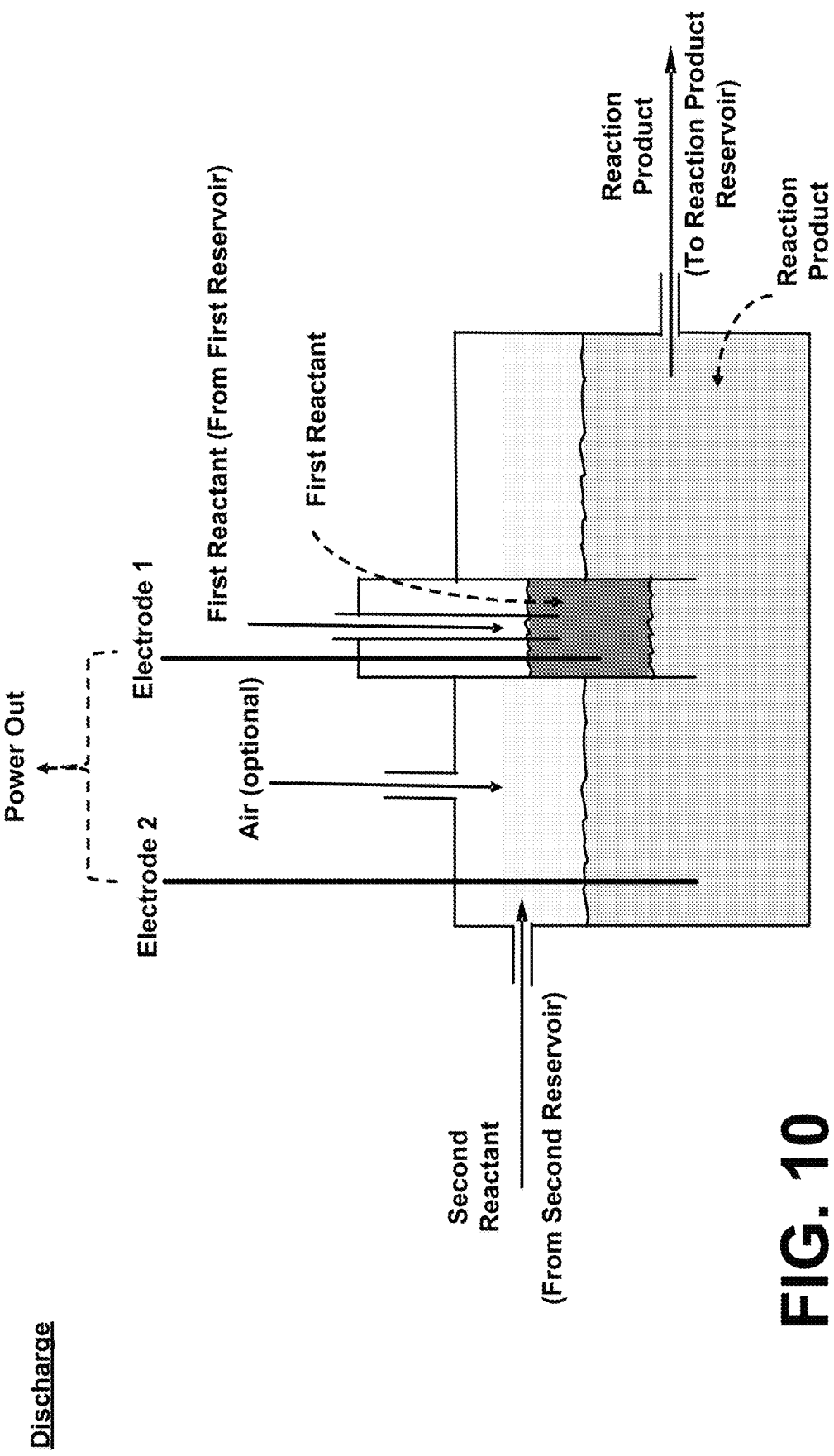
FIGS. 10-11 are another exemplary set of schematic diagrams of another embodiment of an electrochemical reactor in a discharging process and a charging process.
Figure 11:
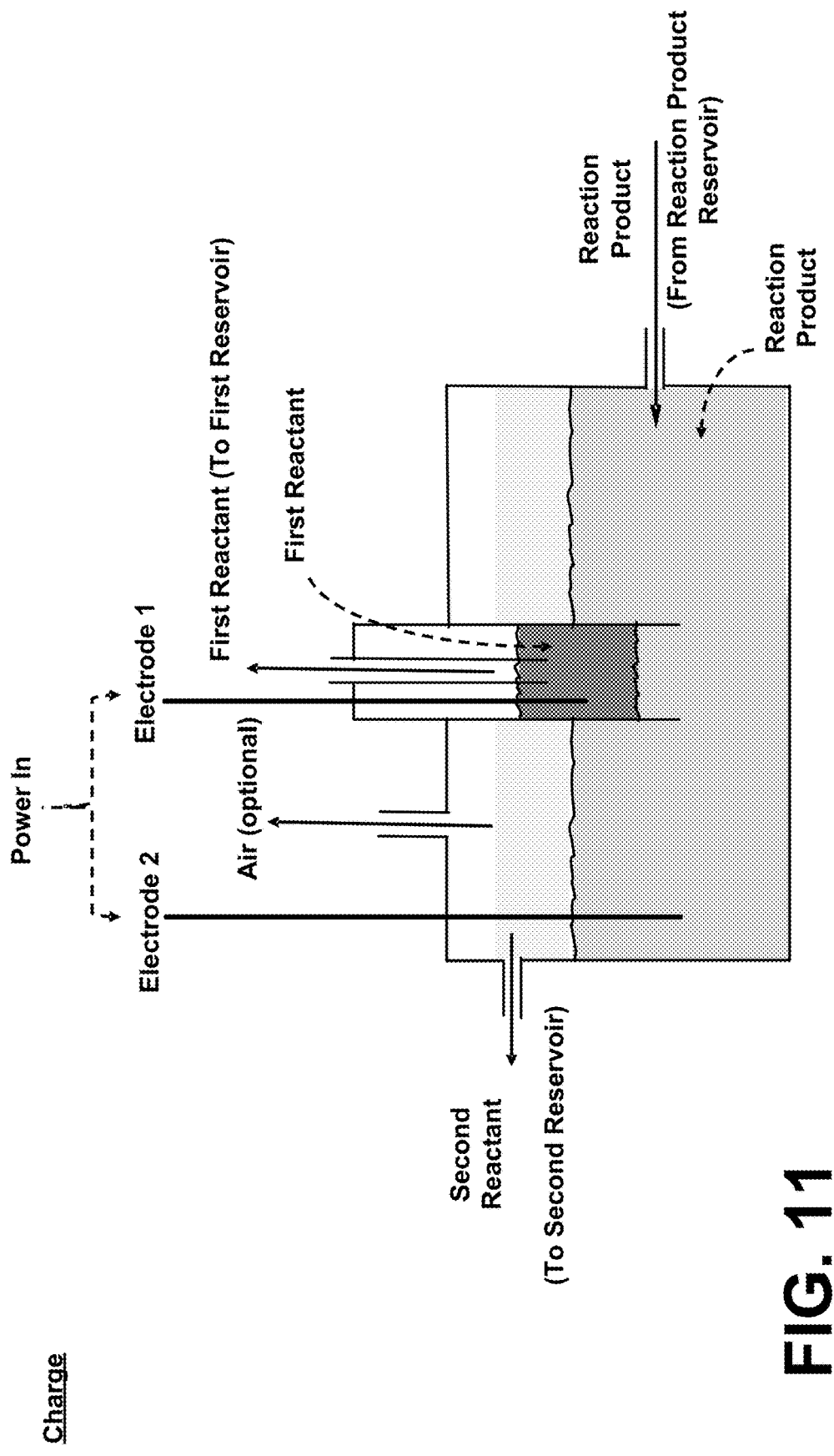

FIGS. 10 and 11 illustrate another exemplary electrochemical reactor design.

Figure 12:
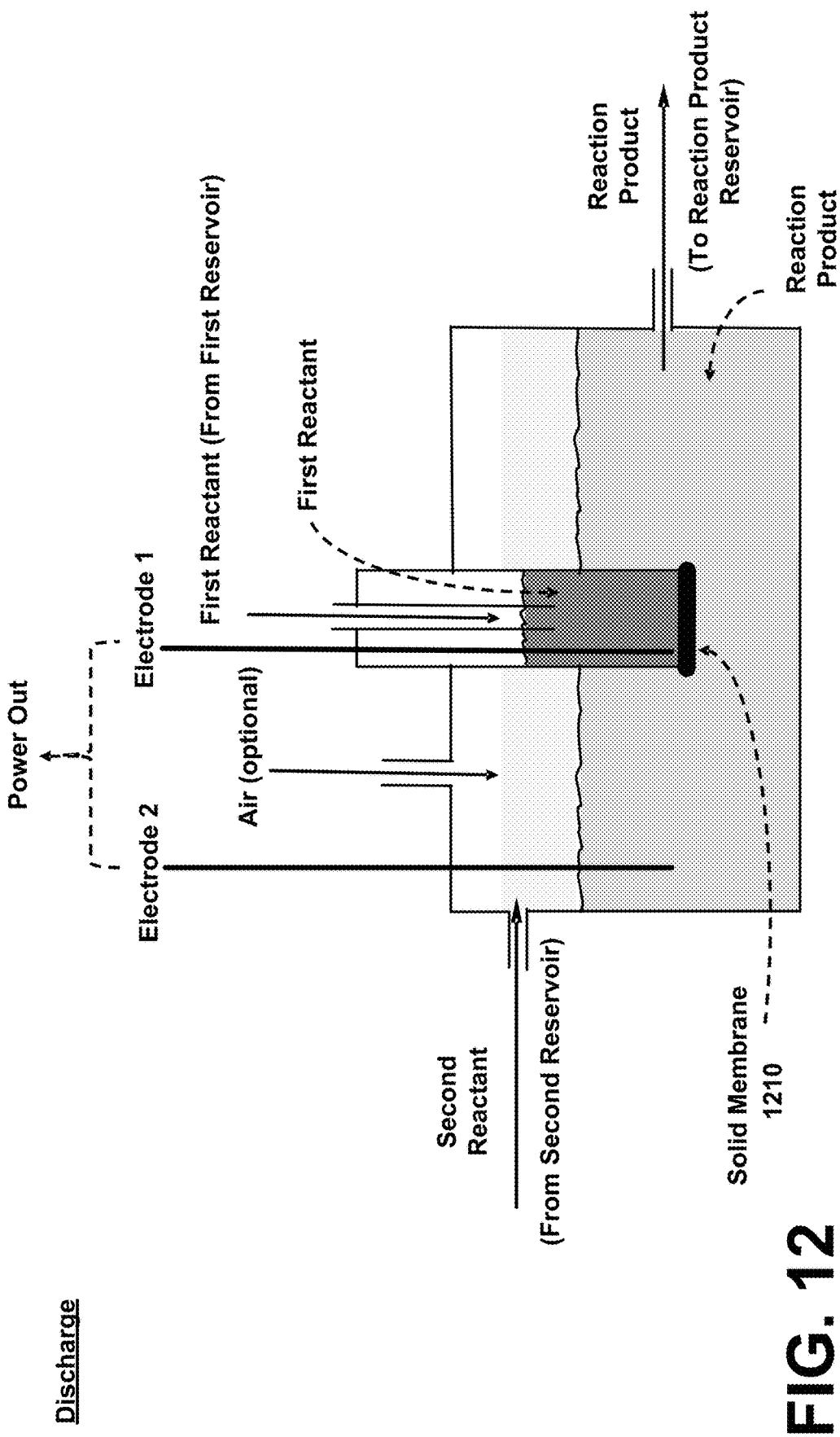
FIGS. 12-13 are another exemplary set of schematic diagrams of another embodiment of an electrochemical reactor with a solid membrane separating the negative chamber in a discharging process and a charging process.
Figure 13:
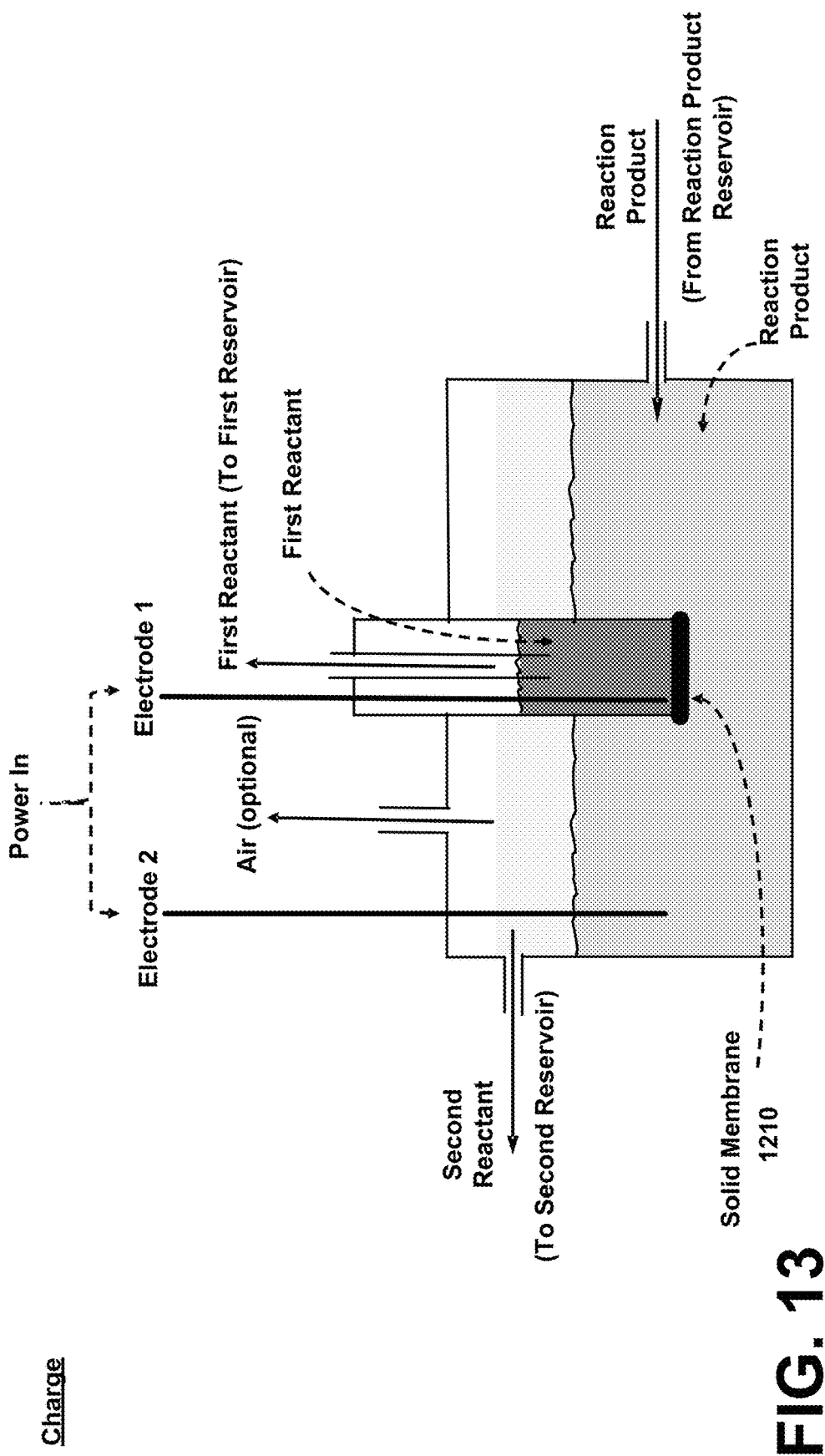

FIGS. 12 and 13 illustrate another chemistry-architecture, where a solid membrane 1210 is used to separate a molten alkali metal chamber from molten hydroxide. In this architecture, the separation is not accomplished by density differences between the fluid reactant and reaction product; instead, a solid that can exhibit alkali ion transport separates the two fluids. An advantage in this design is that it minimizes the self-discharge in case the alkali metal has partial solubility in the molten hydroxide. Since the membrane only allows transportation of ions (and not uncharged material), it restricts the transport on the alkali metal without ionization, and therefore the alkali metal will not self-discharge since it cannot dissolve in the hydroxide.

Figure 14:
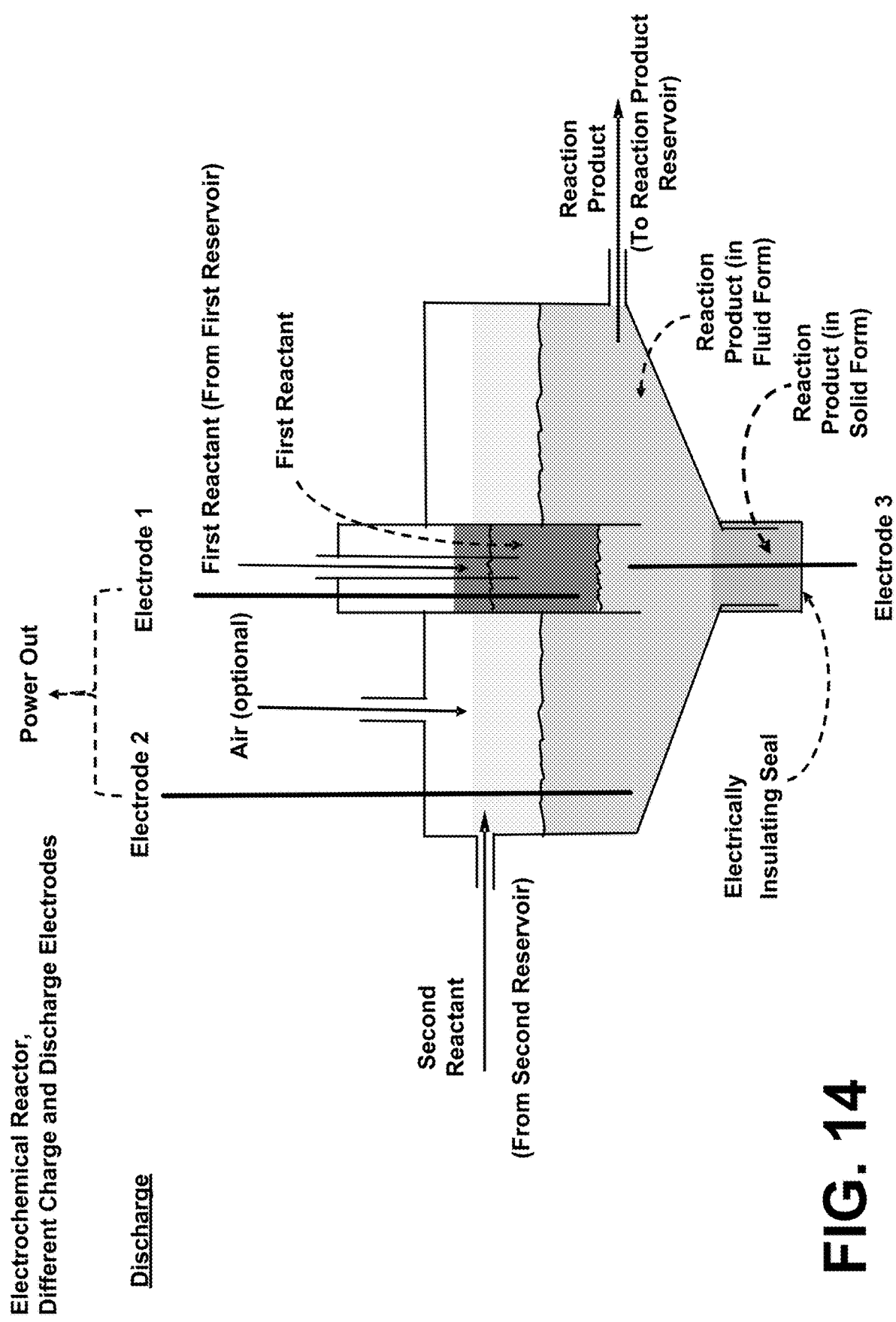
FIGS. 14-15 are another exemplary set of schematic diagrams of another embodiment of an electrochemical reactor in a discharging process and a charging process.
Figure 15:
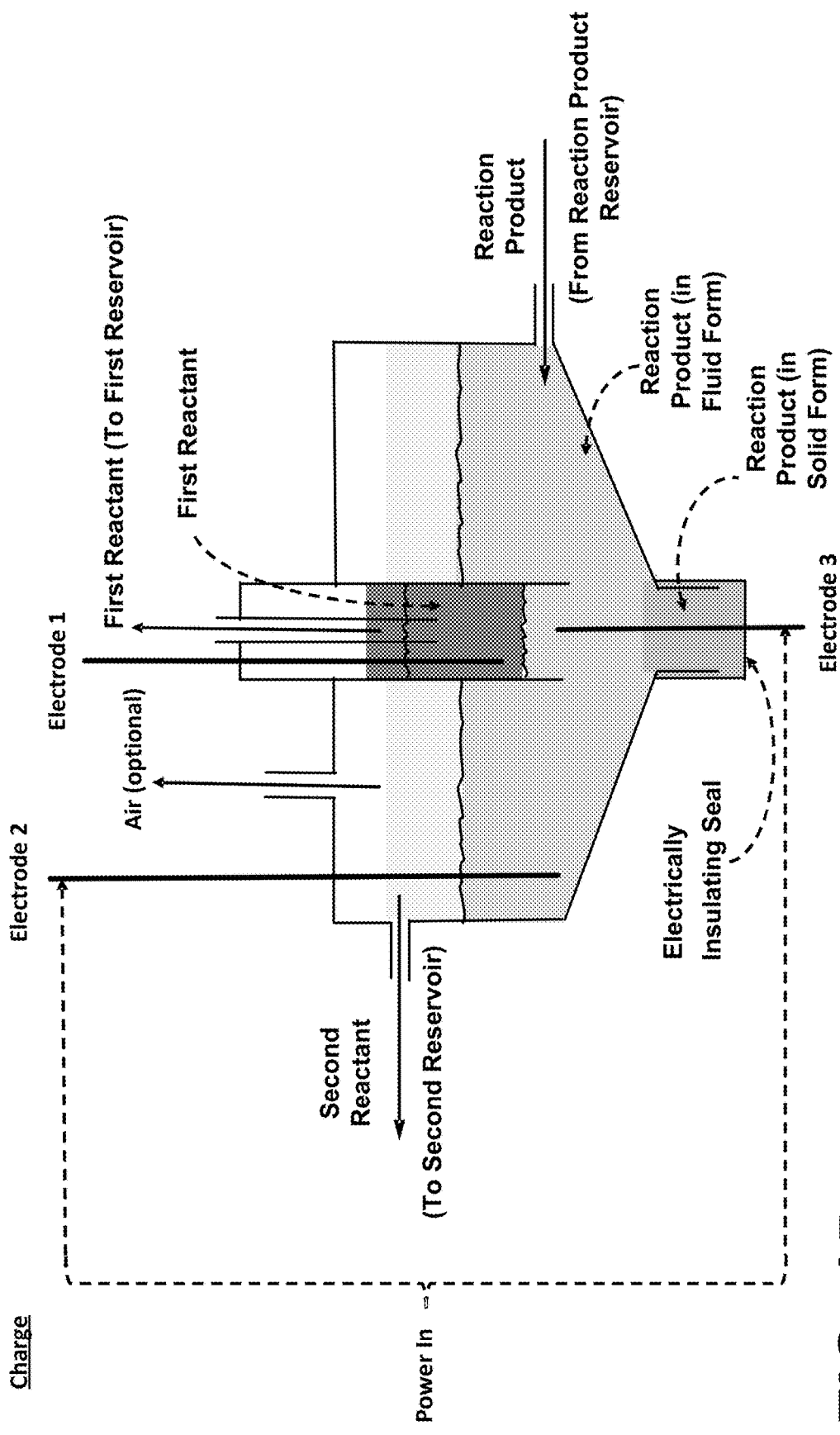
Figures 16A, 16B:
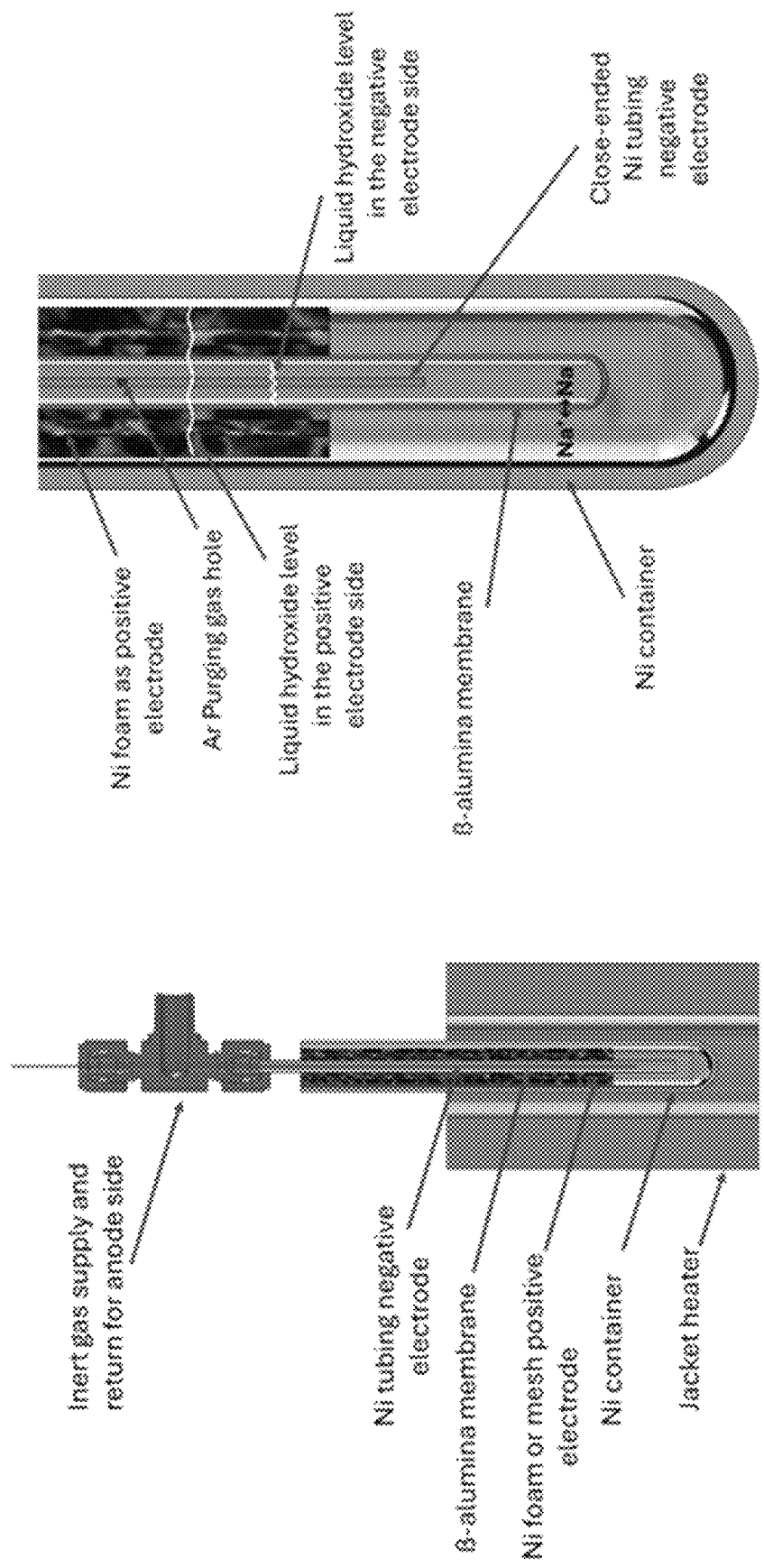
FIGS. 16A-16B illustrate different exemplary embodiments for an NaOH version of the present invention.
Figure 17C:
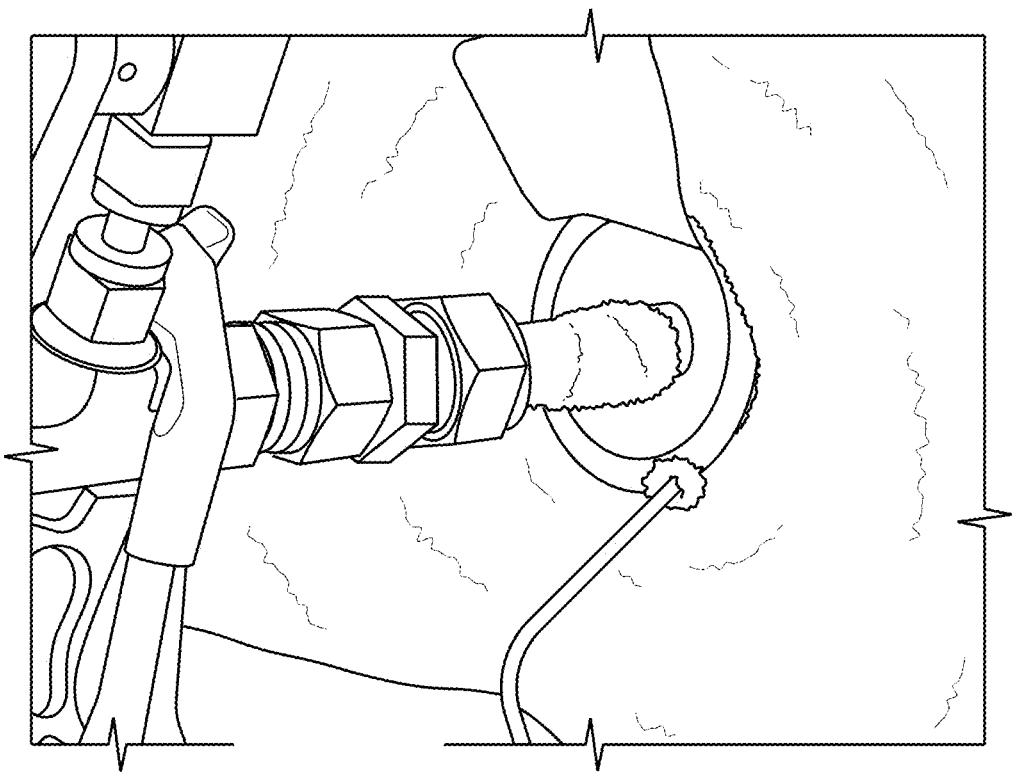
FIGS. 17A-17C illustrate different exemplary embodiments for an NaOH version of the present invention.
Figure 17B:
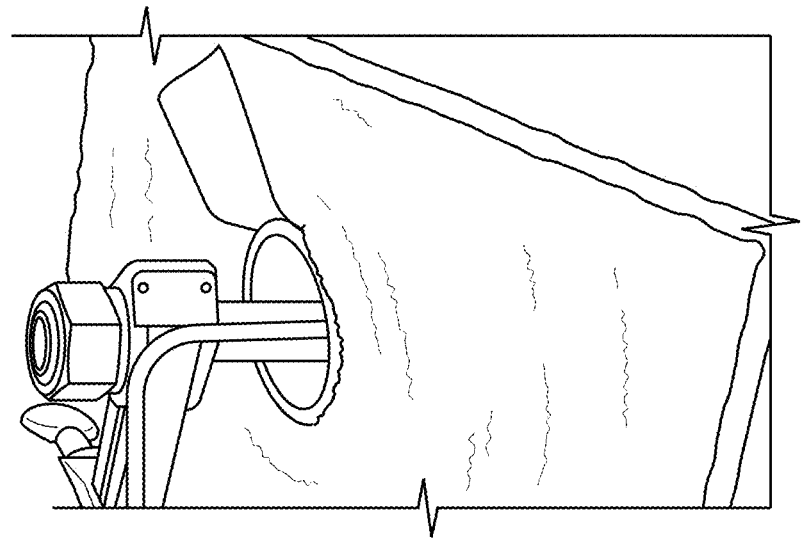
Figure 17A:
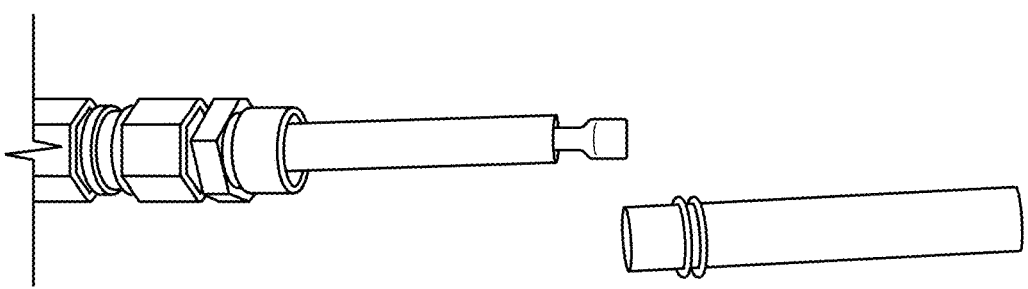

FIGS. 14 and 15 illustrate another exemplary electrochemical reactor design. This design allows for the fabrication of a electrochemical reactor body only using metallic materials without a need for a high temperature insulating ceramic. Since alkali hydroxides are corrosive, the number of ceramic insulators that are compatible with it are very limited. The geometry of this embodiment takes advantage of two negative electrodes, one dedicated to charge and one dedicated to discharge. The charge electrode is always submerged in the hydroxide melt, and the formed alkali metal floats to the surface because of the lower density of alkali metals compared to the molten hydroxides. The metal becomes collected within the boundary region of the secondary negative electrode, which functions as the discharge negative electrode. It should be noted that the solid alkali hydroxide at the bottom of the electrochemical reactor of this embodiment has a low thermal and electrical conductivity and can protect the low temperature electrical insulator that separates the first negative electrode from the electrochemical reactor housing.

Other exemplary chemistry-architectures include the use of the electrochemical reactor as an electrolyzer/fuel electrochemical reactor. In this orientation, the electrochemical reactor is operated under electrochemical conditions where instead of alkali metal being produced, hydrogen is produced in the negative electrode during charge. This involves the molten hydroxide material having a higher level of hydration than in the previous example. During charge of the electrochemical reactor, the electrochemical reactor will act as an electrolyzer—in other words, $H_2O$ dissolved in NaOH will be oxidized to $O_2$ at the positive electrode and $H_2$ will be formed at the negative electrode. In the discharge mode, $H_2$ is injected into the negative electrode chamber (instead of alkali metal) and $O_2$ is injected into the positive electrode chamber. The reaction product is water that will dissolve in the hydroxide. It should be noted that hydroxides are hygroscopic and have very high solubility for water so the salt can easily be hydrated by exposure to water vapor.

The electrochemical reactor can also be operated using an electrochemical condition where alkali peroxide or superoxides are formed at the positive electrode instead of $O_2$ and $H_2O$ gas evolution, while alkali metal is formed at the negative electrode. These species are, for example, $Na_2O_2$ for sodium and $KO_2$ for potassium. An advantage to this design is that in this chemistry-architecture, no gas is formed in the positive or negative electrodes, and therefore the electrochemical reactor can be closed and sealed with no necessity for gas injection. Since peroxides and superoxides have higher melting points than that of hydroxide, these form a thin layer directly on the high surface area positive electrode metallic foam or mesh with rapid charge transfer capabilities. The material for the positive electrode foam can be selected in such a way that promotes formation of these oxides instead of gaseous $O_2$ and $H_2O$. As an example, Cr or Mn are known to be candidates.

In another exemplary architecture-chemistry, alkali-hydrides are formed at the negative electrode. It is known that some alkali metals form hydrides at intermediate temperatures in the presence of hydrogen. As an example, Na forms NaH at 250° C. to 350° C. when exposed to hydrogen. An advantage with hydrides is that since they remain solid, they can be used for long-duration energy storage scenarios, and it can also provide a strategy to remedy and eliminate self-discharge of the electrochemical reactor due to sodium dissolution/reaction with the hydroxide, since the hydride is a more stable compound and will have lower affinity for dissolution in the hydroxide. This makes it possible to preload the negative electrode with sodium and inject hydrogen to the negative chamber to form NaH. Alternatively, after loading sodium at the negative electrode, the electrochemical reactor can be operated in a condition where hydrogen is released in the negative electrode in the presence of sodium and NaH will be formed in-situ at the negative electrode.

Different exemplary embodiments for an NaOH version of the present invention were tested. As shown in FIGS. 16A-16B, 17A-17C, an $Na^+$ conducting ceramic membrane was used as a separator between the positive and the negative electrodes. Hundreds of charge/discharge cycles were performed at 450° C. The electrochemical reactor components are outlined.

A multitude of charge-discharge cycles were performed. FIGS. 18A-18B, 19A-19B show the charge-discharge cycles of the electrochemical reactor. Each cycle comprised:
Constant current 1A for six minutes;
Rest (open circuit) for 30 minutes;
Constant current discharge at 0.1A for 60 minutes; and
Rest (open circuit) for 15 minutes.

The rest steps were used to observe whether or not the electrochemical reactor potential drops overtime without discharging, for example as a result of self-discharging.

Figure 18A:
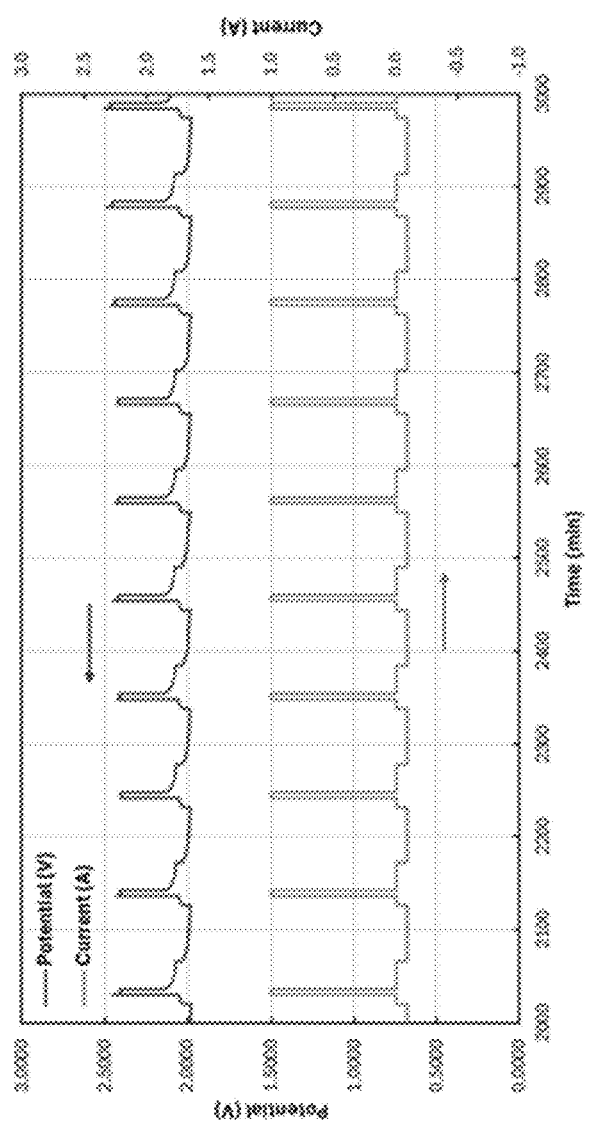
FIGS. 18A-18B are graphs of charge-discharge cycles of an exemplary embodiment of the electrochemical reactor of the present invention.
Figure 18B:
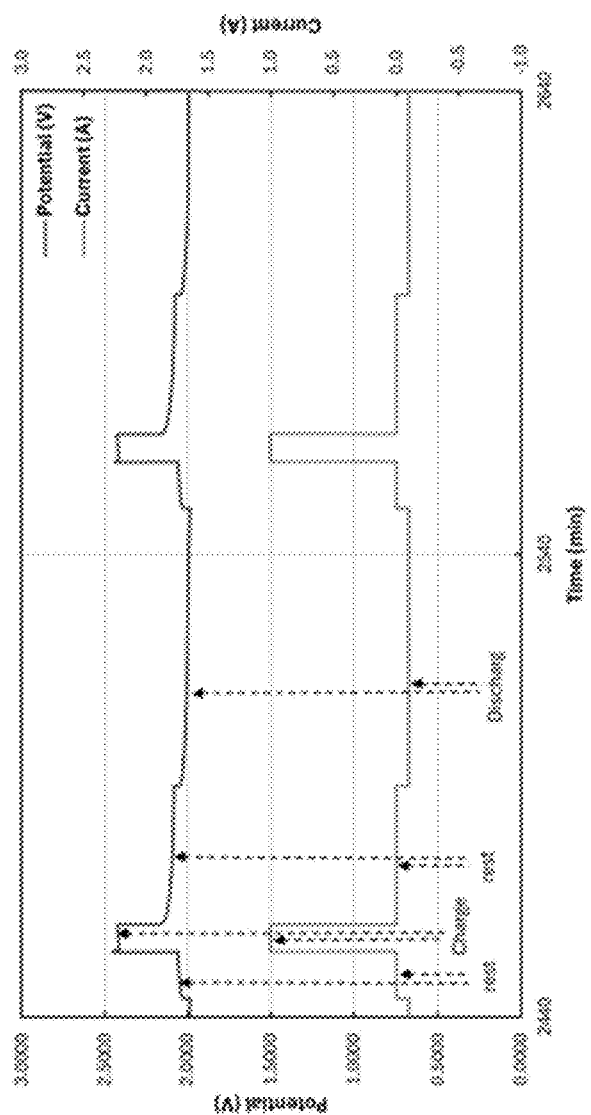
Figure 19A:
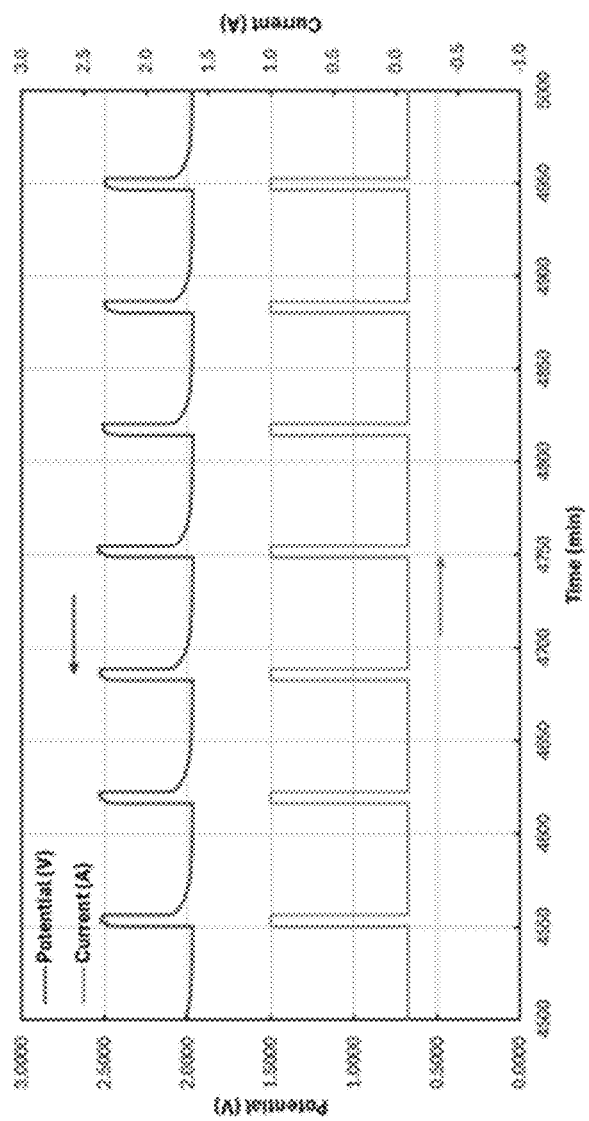
FIGS. 19A-19B are graphs of charge-discharge cycles of another exemplary embodiment of the electrochemical reactor of the present invention.
Figure 19B:
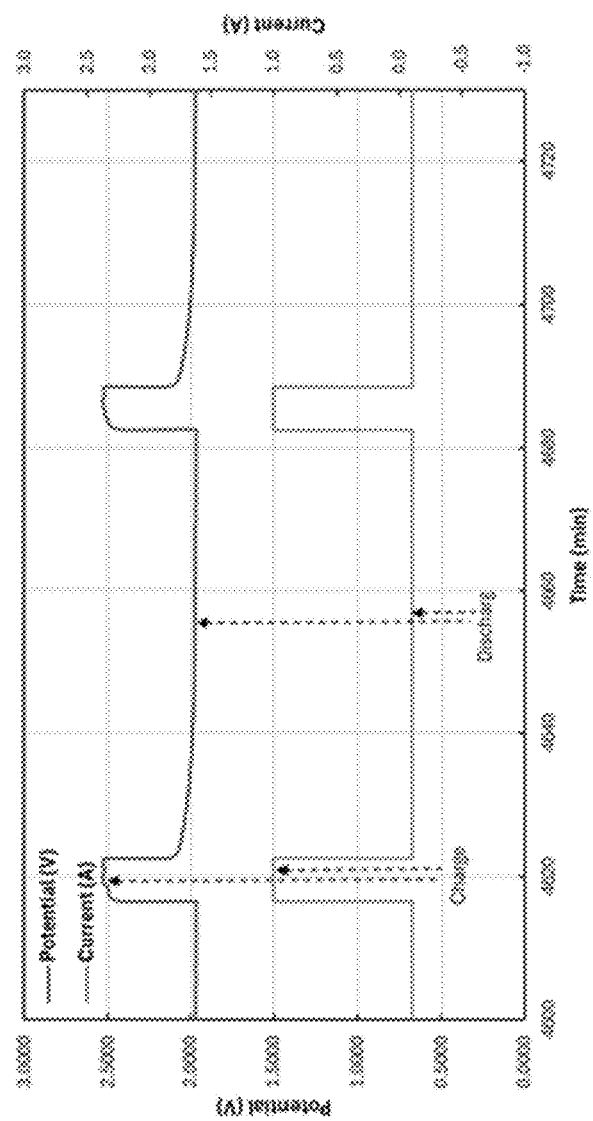

FIGS. 18A-18B illustrate that since no voltage decline was observed during the rest steps, the rest steps were removed. FIGS. 19A-19B show the charge-discharge cycles of the electrochemical reactor without the rest step in between. Each cycle consisted of the following steps:
Constant current 1A for six minutes; and
Constant current discharge at 0.1A for 60 minutes.

As evidenced, the electrochemical reactor's charge/discharge Coulombic efficiency is close to 100%. The open circuit voltage satisfies what was expected from thermodynamic analysis, and the open circuit voltage does not decline overtime during the rest steps, again confirming that the electrochemical reactor does not suffer from self-discharge.

Chemistries used naturally define parameters of the system architecture, and vice versa. For example, using reactants that include sodium, potassium, water, and/or steam can lead to electrochemical reactors formed of relatively simple and inexpensive materials, as each are generally compatible with steel at the temperatures of interest, and steel can be welded to Ni alloys for use in regions wetted by hydroxide.

The molten alkali metals Na and K also show no solubility or intermetallic compounds with Fe or Ni, indicating the suitability of these metals for containment. Ni is notably a better choice than Fe for the electrode contact because of the protective oxide layer that makes it suitable for both negative and positive electrodes of the present invention (where the gas environment is oxidizing). In addition, refractory ceramics such as MgO and nitrides can be used as inert electrical insulators. So too $Al_2O_3$ is an option. Yet another option for insulators is plastics such as PTFE which are chemically compatible with the hydroxide, but with lower service temperature. The Castner process uses cast iron for containment tanks, Ni for electrodes, and ceramics only for thermal insulation.

NaOH and KOH in the solid form are known for their high affinity for water. In the molten high-temperature form, however, their affinity for water sorption decreases significantly, but it is still non-zero. Interestingly, water incorporation into the hydroxide will only cause a minor parasitic loss within the present system and will not lead to significant detrimental effects. This is because the Gibbs free energy of formation of water is significantly smaller than that of NaOH or KOH, and thus water decomposition happens at a lower voltage. Therefore, during charging of the electrochemical reactor, dissolved water will electrolyze to form $H_2$ at the negative electrode and $O_2$ at the positive electrode. Since $H_2$ release happens at a lower voltage, hydrogen is produced first and goes away and only then Na or K will be formed at the negative electrode portion.

Other interesting benefits of exemplary embodiments of the present electrochemical reactor are that it takes advantage of transport of both alkali and hydroxyl ions, and that the alkali hydroxide electrolyte rests on the bottom of the electrochemical reactor and naturally separates the positive and negative electrode chambers. Therefore, no ion-selective separator membrane is needed, although one can be used in some embodiments. Additionally, molten NaOH and KOH are both air-stable, and no reactions with $O_2$ or $N_2$ are anticipated. The only appreciable reaction is dissolution of $CO_2$ and water vapor in the molten hydroxides, which can be managed in sealed electrochemical reactors, and as explained below can be reversed during the charge process.

Theoretical energy densities of the present systems and methods far exceed the state-of-the-art. For example, for the K- and Na-based alkali hydroxide systems, having specific energies of 1220 Wh/kg for K and 1959 Wh/kg for Na, as well as energy densities of 928 Wh/L for K and 1503 Wh/L for Na (see TABLE 2A). In another example, for the Li-based systems with I or Br, the LiI$_{(l)}$ version has a specific energy of 512 and the LiBr$_{(l)}$ version 937 Wh/kg, as well as energy densities of 1770 Wh/L and 2166 Wh/L, respectively (see TABLE 2B).

TABLE 2A

| Active Metallic Element | Overall Reaction | Battery Operating Temperature | Electro-chemical Reactor Voltage | Mass Based Energy Density (Wh/kg) | Volumetric Energy Density (Wh/L) |
|---|---|---|---|---|---|
| Na | $4Na_{(l)} + 2H_2O_{(g)} + O_{2(g)} \rightarrow 4NaOH_{(l)}$ | >318° C. | 2.3 V | 1959 | 1503 |
| K | $4K_{(l)} + 2H_2O_{(g)} + O_{2(g)} \rightarrow 4KOH_{(l)}$ | >420° C. | 2.2 V | 1220 | 928 |

TABLE 2B

| Active Metallic Element | Overall Reaction | Battery Operating Temperature | Electro-chemical Reactor Voltage | Mass Based Energy Density (Wh/kg) | Volumetric Energy Density (Wh/L) |
|---|---|---|---|---|---|
| Li | $Li_{(l)} + \frac{1}{2} I_{2(g)} \rightarrow LiI_{(l)}$ | >469° C. | 2.6 V | 512 | 1770 |
| Li | $Li_{(l)} + \frac{1}{2} Br_{2(g)} \rightarrow LiBr_{(l)}$ | >550° C. | 3.1 V | 937 | 2166 |

Tables 2A/2B—Chemical Characteristics and Theoretical Energy Metrics of Exemplary Embodiments of the Present Invention The energy efficiency is expected to be >75% because of the good electrochemical reversibility. A peak power density of >1.5 kW/kg is enabled by the high conductivity of the electrolyte at operation temperatures (>2 S/cm) and the parallel configuration of individual electrochemical reactors.

Continuous power capability of >0.5 kW/kg is expected with an exemplary system and method using low-cost electrode materials: Na is ~$3/kg and K is ~$13/kg while air and H$_2$O are essentially free. In terms of raw material costs, the lower bounds for the system cost are thus ~1.2 $/kWh for Na and ~8.3 $/kWh for K.

In other exemplary embodiments, the present invention is an electrochemical method comprising transporting stored first reactant in a first stored state to a reaction zone of an electrochemical reactor in a fluid state, transporting stored second reactant in a second stored state to the reaction zone in a fluid state, and transporting a reaction product from the electrochemical reactor, the reaction product in a fluid state in the electrochemical reactor as a result of an electrochemical reaction in the reaction zone between the first and second reactants.

As evidenced in TABLES 2A, 2B, the electrochemical reactor can comprise a rechargeable battery with an energy density of from 512 to >1900 Wh/kg. The electrochemical reactor can comprise a rechargeable battery with an energy density of from 929 to >2100 Wh/L.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. An electrochemical system comprising:
    a first reservoir configured to contain a first reactant;
    a second reservoir configured to contain a second reactant separately from the first reactant;
    an electrochemical reactor in material transport communication with the first reservoir and the second reservoir;
    a reaction product reservoir in material transport communication with the electrochemical reactor; and
    a material transport assembly configured to:
        provide the material transport communication between the electrochemical reactor and the first reservoir, the second reservoir, and the reaction product reservoir;
        present the first reactant as a fluid to the electrochemical reactor; and
        present the second reactant as a fluid to the electrochemical reactor;
    wherein:
        the electrochemical system is configured to maintain a reaction product as a fluid, the reaction product resultant from an electrochemical reaction in the electrochemical reactor between the first reactant and the second reactant, and the reaction product comprising an ionically conductive, yet electronically insulating, fluid; and
        the reaction product reservoir is configured to contain the reaction product separately from the first reactant and the second reactant.

2. The electrochemical system of claim 1 further comprising a thermal management mechanism configured to at least one of:
    provide heat to one or more portions of the material transport assembly; or remove heat from one or more portions of the material transport assembly;

such that a temperature of reactant and/or reaction product flowing through the material transport assembly at one or more locations of the thermal management mechanism is respectively raised or cooled.

3. The electrochemical system of claim 2, wherein the thermal management mechanism is further configured to exchange heat between the reservoirs.

4. The electrochemical system of claim 1, wherein the material transport assembly is further configured to:
   draw at least a portion of the first reactant from the electrochemical reactor to the first reservoir;
   draw at least a portion of the second reactant from the electrochemical reactor to the second reservoir; and
   draw at least a portion of the reaction product from the electrochemical reactor to the reaction product reservoir.

5. The electrochemical system of claim 4, wherein the material transport assembly comprises:
   conduits formed of one or more materials that are stable at temperatures at which the material transport assembly is subject to via the transport of the reactants, and the reaction product; and
   one or more transport control devices selected from a group consisting of valves, pumps, mass flow controllers, and a combination thereof.

6. The electrochemical system of claim 1, wherein the electrochemical reactor comprises:
   a negative electrode portion in material transport communication with the first reservoir; and
   a positive electrode portion in material transport communication with the second reservoir.

7. The electrochemical system of claim 6, wherein the electrochemical reactor is configured such that the negative electrode portion and the positive electrode portion are separated one from the other via a density difference between the reaction product and the first and second reactants.

8. The electrochemical system of claim 6, wherein the negative electrode portion and the positive electrode portion of the electrochemical reactor are separated one from another via a physical separator positioned within the electrochemical reactor and forming a geometrical interface between the first reactant and the second reactant.

9. The electrochemical system of claim 8, wherein the separator is a high surface area current collector/current delivery structure positioned in the positive electrode portion of the electrochemical reactor.

10. The electrochemical system of claim 9, wherein the separator comprises a metallic mesh structure.

11. An electrochemical system of claim 8, comprising:
    a first reservoir configured to contain a first reactant;
    a second reservoir configured to contain a second reactant separately from the first reactant;
    an electrochemical reactor comprising:
       a negative electrode portion in material transport communication with the first reservoir; and
       a positive electrode portion in material transport communication with the second reservoir;
       wherein the negative electrode portion and the positive electrode portion are separated one from another via a separator positioned within the electrochemical reactor and forming a geometrical interface between the first reactant and the second reactant;
       the separator is a high surface area current collector/current delivery structure positioned in the positive electrode portion of the electrochemical reactor; and
    a material transport assembly configured to:
       provide the material transport communication between the electrochemical reactor and the first reservoir and the second reservoir;
       present the first reactant as a fluid to the electrochemical reactor; and
       present the second reactant as a fluid to the electrochemical reactor;
    wherein the electrochemical system is configured to maintain a reaction product as a fluid, the reaction product resultant from an electrochemical reaction in the electrochemical reactor between the first reactant and the second reactant, and the reaction product comprising an ionically conductive, yet electronically insulating, fluid.

12. The electrochemical system of claim 11 further comprising:
    a reaction product reservoir in material transport communication with the electrochemical reactor;
    wherein:
       the material transport assembly is further configured to provide the material transport communication between the electrochemical reactor and the reaction product reservoir; and
       the reaction product reservoir is configured to contain the reaction product separately from the first reactant and the second reactant.

13. The electrochemical system of claim 11 further comprising a thermal management mechanism configured to at least one of:
    provide heat to one or more portions of the material transport assembly; or
    remove heat from one or more portions of the material transport assembly;
    such that a temperature of reactant and/or reaction product flowing through the material transport assembly at one or more locations of the thermal management mechanism is respectively raised or cooled.

14. The electrochemical system of claim 11, wherein the material transport assembly is further configured to:
    draw at least a portion of the first reactant from the electrochemical reactor to the first reservoir;
    draw at least a portion of the second reactant from the electrochemical reactor to the second reservoir; and
    draw at least a portion of the reaction product from the electrochemical reactor to a reaction product reservoir.

15. The electrochemical system of claim 13, wherein the thermal management mechanism is further configured to exchange heat between the reservoirs.

16. The electrochemical system of claim 14, wherein the material transport assembly comprises:
    conduits formed of one or more materials that are stable at temperatures at which the material transport assembly is subject to via the transport of the reactants, and the reaction product; and
    one or more transport control devices selected from a group consisting of valves, pumps, mass flow controllers, and a combination thereof.

* * * * *